United States Patent
Tomita

(10) Patent No.: US 6,577,566 B1
(45) Date of Patent: Jun. 10, 2003

(54) OPTICAL DISK RECORDING AND/OR PLAYBACK APPARATUS, OPTICAL DISK RECORDING AND/OR PLAYBACK METHOD AND TRACKING CONTROL METHOD

(75) Inventor: Nobuyoshi Tomita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/556,724

(22) Filed: Apr. 21, 2000

(30) Foreign Application Priority Data

Apr. 23, 1999 (JP) .......................................... 11-116426

(51) Int. Cl.[7] ................................................. G11B 7/00
(52) U.S. Cl. .................................. 369/44.26; 369/53.23
(58) Field of Search ........................... 369/44.11, 44.12, 369/44.13, 44.23, 44.26, 53.23, 53.28, 53.29

(56) References Cited

U.S. PATENT DOCUMENTS

| | | | | |
|---|---|---|---|---|
| 5,844,883 A | * | 12/1998 | Kanno et al. | 369/53.29 |
| 5,995,457 A | * | 11/1999 | Jamail | 369/30.04 |
| 6,069,870 A | * | 5/2000 | Maeda et al. | 369/275.4 |
| 6,345,024 B2 | * | 2/2002 | Sugasawa et al. | 369/53.2 |
| 6,351,287 B1 | * | 2/2002 | Sakaegi et al. | 369/116 |

FOREIGN PATENT DOCUMENTS

| | | |
|---|---|---|
| EP | 0 798 703 | 10/1997 |
| EP | 0 821 350 | 1/1998 |
| GB | 2 307 589 | 5/1997 |
| JP | 10-40549 | 2/1998 |

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

Disclosed is an apparatus for recording and playback data into and from an optical disc having: first tracks including a wobbled track and a non-wobbled track each implemented by either a land or a groove; and second tracks each sandwiched by the first tracks and used for recording information wherein if the first track is implemented by a groove, the second track is implemented by a land and if the first track is implemented by a land, the second track is implemented by a groove. The apparatus includes a unit for radiating a beam to a particular track on the disc; a unit for detecting a beam reflected by the particular track on the disc; and a unit for controlling the radiation unit so as to have the radiation unit trace a wobbled track adjacent to the particular track in accordance with the reflected beam.

The apparatus is capable of generating a tracking-error signal by using only 1 beam.

41 Claims, 18 Drawing Sheets

FIG. 3

| | MD-DATA2 | MD-DATA1 |
|---|---|---|
| TRACK PITCH | 0.95 μm | 1.6 μm |
| PIT LENGTH | 0.39 μm/bit | 0.59 μm/bit |
| λ·NA | 650nm·0.52 | 780nm·0.45 |
| RECORDING TECHNIQUE | LAND RECORDING | GROOVE RECORDING |
| ADDRESS TECHNIQUE | INTERLACE ADDRESSING (DOUBLE-SPIRAL ONE-SIDE WOBBLING) | SINGLE-SPIRAL BOTH-SIDE WOBBLING |
| MODULATION TECHNIQUE | RLL (1, 7) | EFM |
| ERROR CORRECTION TECHNIQUE | RS-PC | ACIRC |
| INTERLEAVING | BLOCK COMPLETION | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 650MB | 140MB |

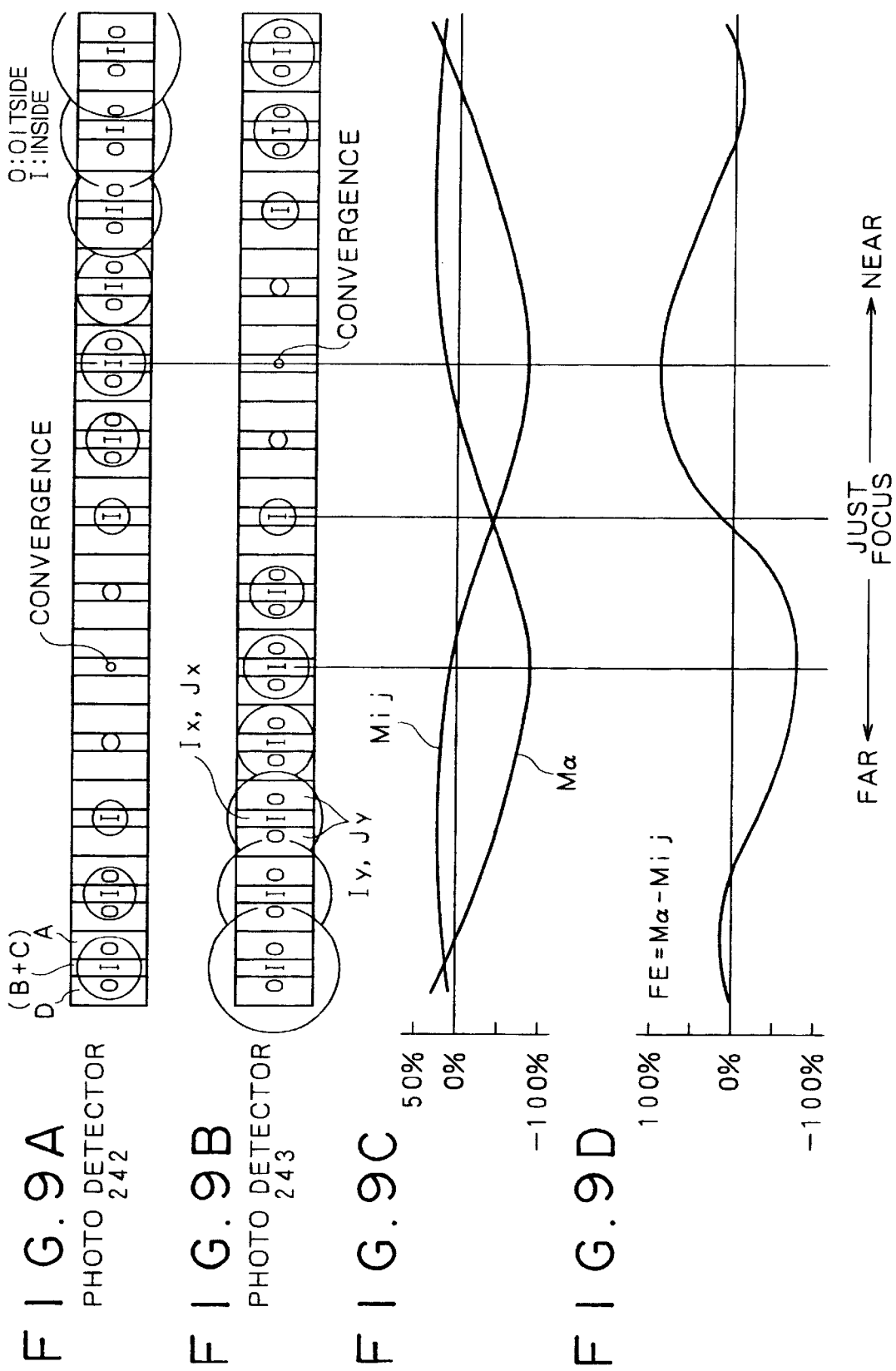

F I G. 10A
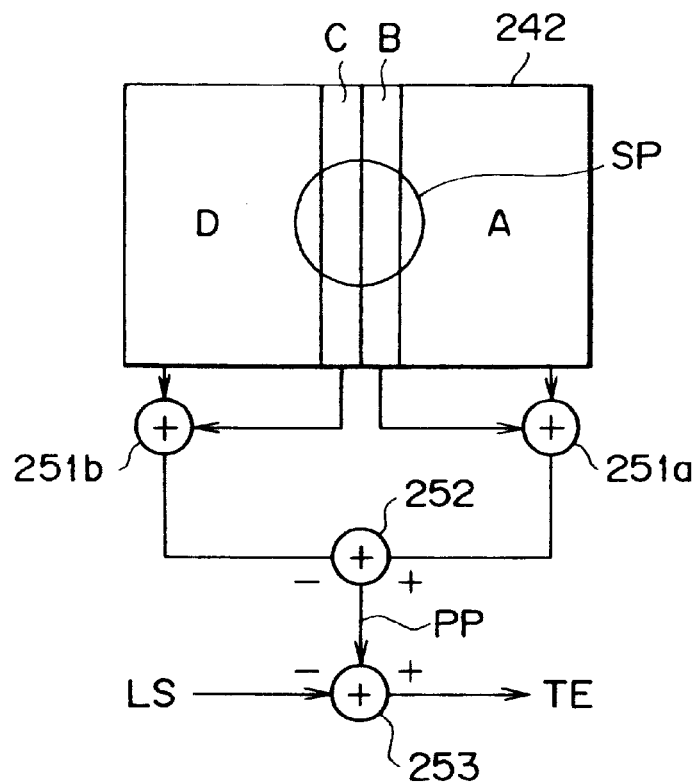
F I G. 10B
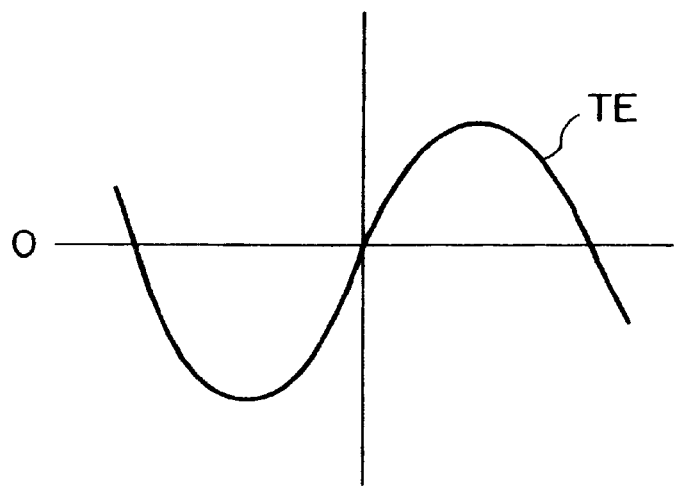

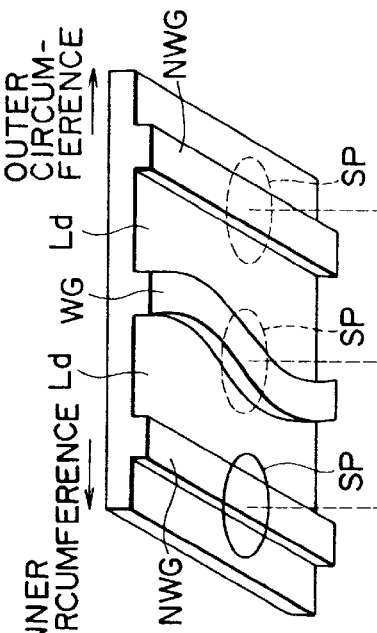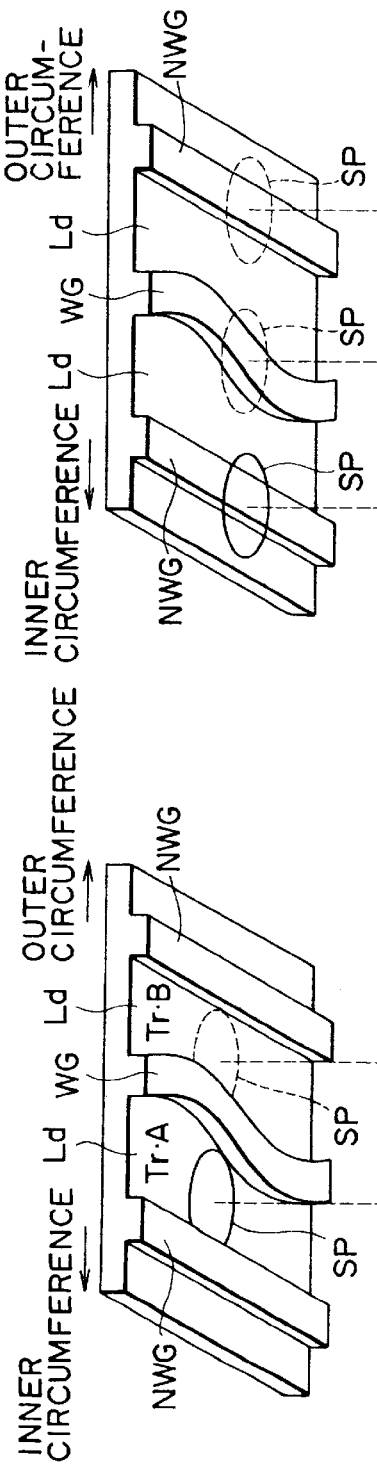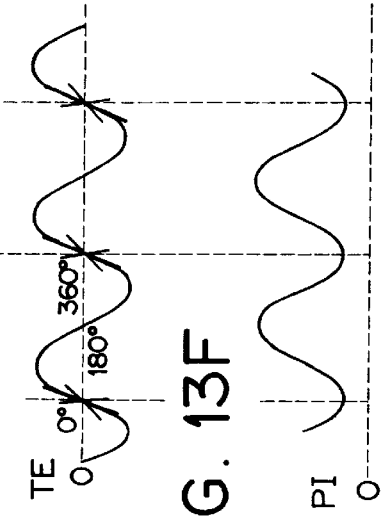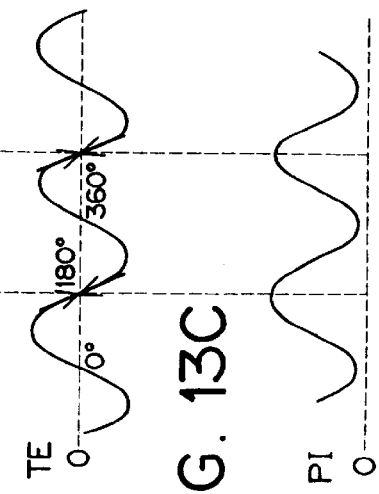

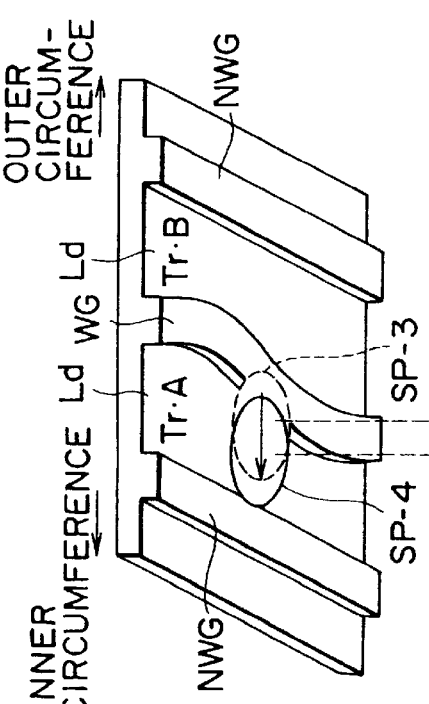
FIG. 14A
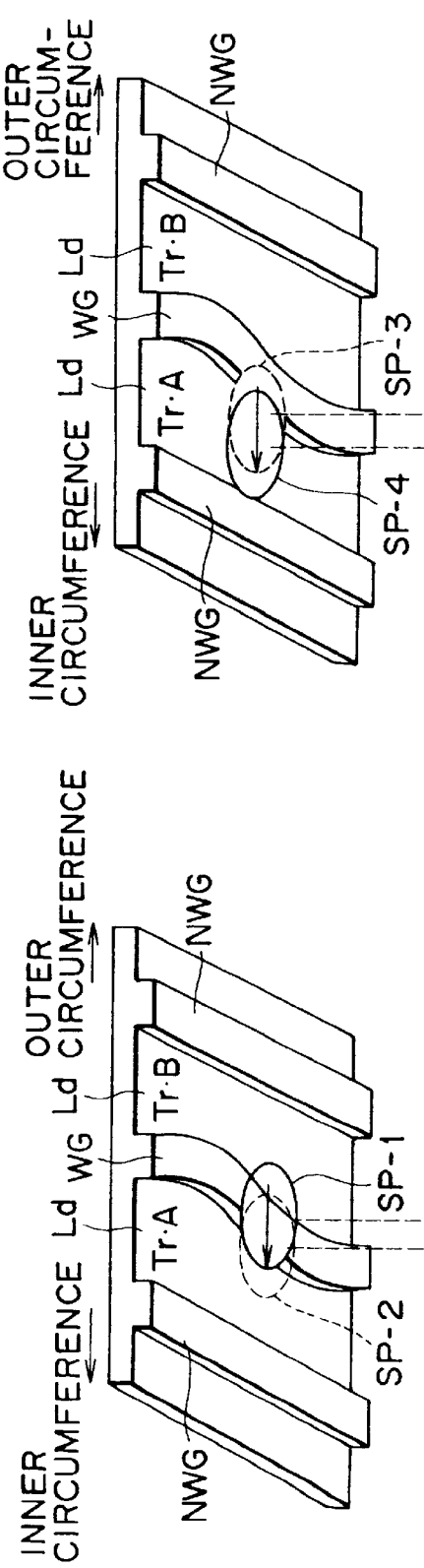
FIG. 14D
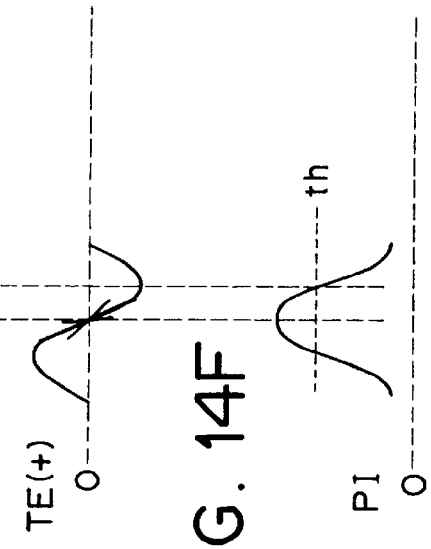
FIG. 14B
FIG. 14E
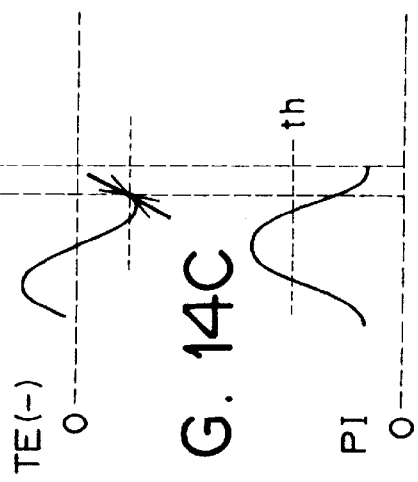
FIG. 14C
FIG. 14F

OPTICAL DISK RECORDING AND/OR PLAYBACK APPARATUS, OPTICAL DISK RECORDING AND/OR PLAYBACK METHOD AND TRACKING CONTROL METHOD

BACKGROUND OF THE INVENTION

The present invention relates to an optical-disk recording and/or playback apparatus, an optical-disk recording and/or playback method for recording and/or playing back data into and from an optical disc-shaped recording medium and relates to a tracking control method adopted in the optical disk recording and/or playback apparatus for tracing a circular track created on the optical disc-shaped recording medium.

In recent years, rewritable disc-shaped media has become very popular. An example of such media is a magneto optical disc such as an MD (Mini Disc, a trademark).

As is generally known, on such a rewritable disc, no tracks are formed as pits. Instead, grooves and lands are created so that a track can be traced correctly by a laser beam radiated by an optical pickup in recording and playback operations.

In a groove system adopted in a conventional MD system for recording data into grooves, for example, tracks each serving as a groove are created in advance by providing wobbling based on a modulated signal obtained as a result of frequency modulation of a signal by addresses to each of the tracks. To put it in detail, surfaces on both sides of a groove are each physically formed into a shape wobbled along the circumferential direction of the disc. A groove created in this way is referred to as a wobbled groove.

In a recording/playback apparatus, tracking-servo control is executed so that a laser beam is correctly radiated to a track created as a groove or a land described above. In addition, an objective lens to which the laser beam is output is used as a means for executing focus-servo control so as to focus the laser beam on the track created on a signal surface. In the recording/playback apparatus, a modulation component representing a wobbled groove is extracted from information conveyed by a laser beam reflected by the disc to produce an address. As described above, in the recording/playback apparatus, pieces of servo controls are executed and information on addresses is acquired to implement a recording or playback operation by making accesses to the addresses.

In addition, the present applicant has earlier proposed a disc having a format described below and based on an MD format in order to implement an even higher recording density.

The format adopts a land recording system f or recording data into a land used as a recording track.

On such a disc, 2 recording tracks each implemented by a land are used as a pair and the pair of recording tracks is created to form a spiral. That is to say, on the disc, 2 lands are created to form a spiral. A wobbling shape created by modulation based on address information is thus created on each side surface of a groove formed between the 2 lands.

If this physically created state is seen from a land, a wobbling shape is created on a side surface on only one side of each of the 2 lands. That is, the pair of recording tracks implemented by 2 lands share the wobbling shape of a groove created between the 2 lands or share the address information.

Thus, in a recording or playback operation, by extracting a modulation component of the wobbling shape created on a side surface on only one side of each of the 2 lands from information conveyed by a reflected laser beam, an address can be decoded without regard to which of the 2 lands is being traced.

In a spiral track structure comprising 2 lands forming a pair as described above, the address represented by the wobbling shape of a groove formed between the 2 lands is shared by the lands. Thus, with the format for implementing a high recording density, the track pitch can be made smaller than that of the conventional MD. As a result, with this format, the recording density can be increased by for example adopting an appropriate modulation system of recorded data.

It should be noted that the address system adopted for such a disc structure is referred to as an interlace addressing system and a disc having a format conforming to this system is known as an interlace addressing disc.

By the way, in an interlace addressing disc described above, 2 recording tracks each used typically for recording data form a pair.

For this reason, it is necessary to actually carry out a recording/playback operation while forming a judgment as to which one of the 2 tracks of the pair is being traced.

The judgment as to which one of the 2 tracks of the pair is being traced will be described later in detail in the explanation of an embodiment. The judgment is formed by using a simplest configuration applying the so-called 3-beam method. The 3-beam method is one of techniques for generating a tracking-error signal used in the tracking-servo control.

By the way, an optical pickup corresponding to the 3-beam method has a problem of a large-size configuration of an optical system itself which is used for radiating a laser beam, a problem of complexity of a photo detector for receiving and detecting a reflected laser beam and a problem of complexity of a processing circuit system for processing a reflected-beam information signal output by the photo detector.

In the case of the so-called push-pull system for implementing generation of a tracking-error signal by using a beam, on the other hand, the configuration of an optical pickup including the photo detector and the configuration of the signal processing circuit system for processing a reflected-beam information signal output by the photo detector can be made simpler.

That is to say, considering the background described above, even in the case of a disc drive apparatus assuming operations to record and play back data into and from an interlace addressing disc, it is desirable to adopt the configuration of an optical pickup based on the push-pull system. If the push-pull system is adopted, however, it is impossible to form a judgment on a track by applying the 3-beam method described above. Thus, in order to adopt the push-pull system, another technique is required for allowing a target track to be traced correctly.

SUMMARY OF THE INVENTION

It is thus an object of a recording and/or playback apparatus provided by the present invention to solve the problems described above.

In order to achieve the object described above, the present invention provides an optical-disc recording and/or playback apparatus capable of carrying out operations to record and play back data into and from an optical disc, the disc comprising: first tracks including a wobbled track and a non-wobbled track each implemented by either a land or a groove where a wobbled track is a track with both side surfaces thereof wobbled whereas a non-wobbled track is a track with neither of side surfaces thereof wobbled; and second tracks each sandwiched by the first tracks and used for recording information wherein if the first track is implemented by a groove, the second track is implemented by a land and if the first track is implemented by a land, the second track is implemented by a groove, the optical-disc recording and/or playback apparatus comprising: radiation means for radiating a beam to any particular one of the tracks on the optical disc; reflected-beam detection means for detecting a beam reflected by the particular track on the optical disc; and control means for controlling the radiation means so as to have the radiation means trace a wobbled track adjacent to the particular track in accordance with the reflected beam.

BRIEF DESCRIPTION OF THE DIAGRAMS

FIG. 3 is an explanatory diagram showing a table of specifications of the disc for the video camera provided by the embodiment;

FIG. 9A is a diagram showing a converged state of a beam spot on a photo detector provided by the embodiment;

FIG. 9B is a diagram showing a converged state of a beam spot on a photo detector provided by the embodiment;

FIG. 9C is a diagram showing graphs representing waveforms of signals output from detection areas of the photo detectors and provided by the embodiment;

FIG. 9D is a diagram showing graphs representing waveforms of focus-error signals output from detection areas of the photo detectors and provided by the embodiment;

FIG. 10A is an explanatory diagram showing a typical configuration of a tracking-error signal generation circuit provided by the embodiment;

FIG. 10B is an explanatory diagram conceptually showing tracking-servo control provided by the embodiment;

FIG. 13A is an explanatory diagram showing an on-track state of a laser spot along a land in the embodiment;

FIG. 13B is a diagram showing a graph representing the waveform of a tracking-error signal for the state shown in FIG. 13A;

FIG. 13C is a diagram showing a graph representing the waveform of a pull-in signal for the state shown in FIG. 13A;

FIG. 13D is an explanatory diagram showing an on-track state of a laser spot along a groove in the embodiment;

FIG. 13E is a diagram showing a graph representing the waveform of a tracking-error signal for the state shown in FIG. 13D;

FIG. 13F is a diagram showing a graph representing the waveform of a pull-in signal for the state shown in FIG. 13D;

FIG. 14A is an explanatory diagram showing a transition of a laser spot caused by a jump of 0.5 tracks from a state of on-track along a wobbled groove in the embodiment;

FIG. 14B is a diagram showing a graph representing the waveform of a tracking-error signal for the state shown in FIG. 14A and a state of applying a bias to a target value;

FIG. 14C is a diagram showing a graph representing the waveform of a pull-in signal for the state shown in FIG. 14A and a threshold value for a changing polarity;

FIG. 14D is an explanatory diagram showing a transition of a laser spot caused by a jump of 0.5 tracks from a state of on-track along a wobbled groove with an operating polarity switched to an opposite polarity toward a state of on-track along a land in the embodiment;

FIG. 14E is a diagram showing a graph representing the waveform of a tracking-error signal for the state shown in FIG. 14D and a target value for the opposite polarity;

FIG. 14F is a diagram showing a graph representing the waveform of a pull-in signal for the state shown in FIG. 14D and a threshold value for a changing polarity;

DETAILED DESCRIPTION OF THE INVENTION

Hereinafter, a preferred embodiment of a disc drive apparatus of the present invention will be described in detail with reference to the drawings. The disc drive apparatus is exemplified by an embodiment mounted on a portable video camera which has a camera unit integrated with a recording/playback apparatus capable of recording and playing back sounds and pictures, that is, static picture or moving pictures.

The recording/playback apparatus mounted on the video camera is the disc drive apparatus implemented by the embodiment. The disc drive apparatus has a configuration for recording and playing back data into and from the so-called mini disc (a trademark) which is known as a sort of magneto optical disc.

The description is given in the following order:
1. Disc Formats
2. Internal Configuration of the Video Camera
3. Configuration of the Media Drive
4. Configuration of the Optical Head
5. Processing in the Matrix Amplifier and the RF Amplifier
6. Access Operations
   6-1 Overview of the operations
   6-2 Configuration of the Tracking-Servo Control Circuit
   6-3 Processing Operations
7. Modified Versions 1. Disc Formats The recording/playback apparatus implemented by an embodiment mounted on a video camera is used for recording and playing back data into and from a mini disc or a magneto optical disc in conformity with a format called an MD-data (a trade mark) format. As the MD-data format, there has been developed 2 types of format, namely, MD-DATA1 (a trademark) and MD-DATA2 (a trademark) formats. The video camera provided by this embodiment is used for recording and playing back data in the MD-DATA2 format which offers a recording density higher than the MD-DATA1 format. Therefore, the description begins with an explanation of the MD-DATA2 format of the disc.

Figure 1:
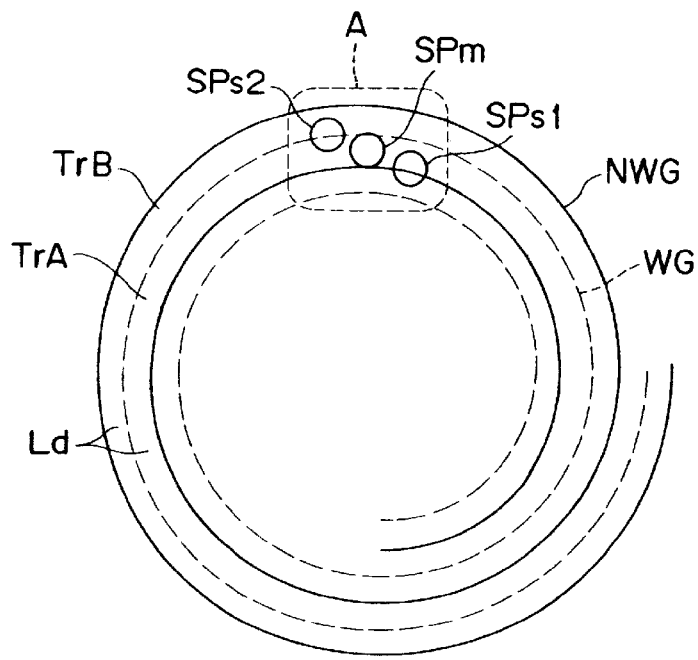
FIG. 1 is an explanatory diagram showing the track structure of a disc for a video camera provided by an embodiment of the present invention.
Figures 2A, 2B:
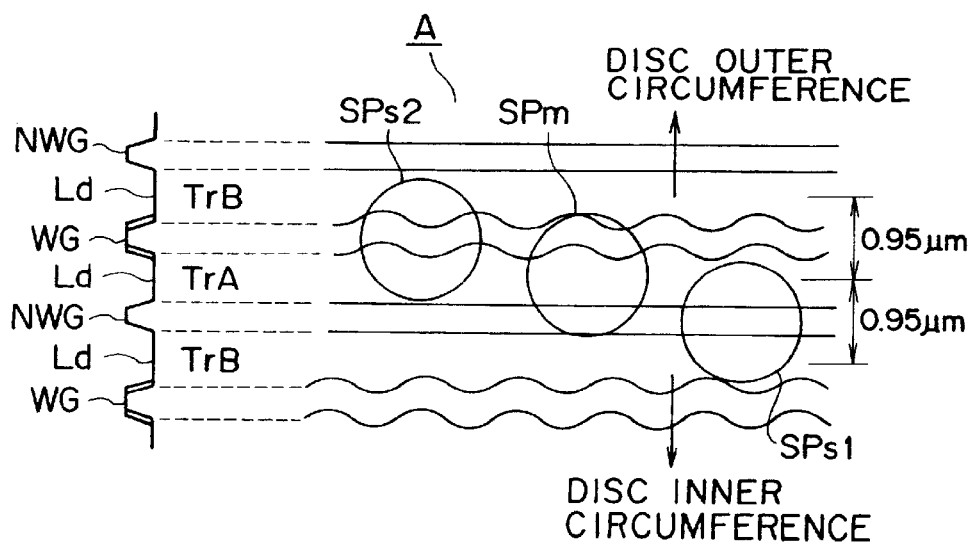
FIG. 2A is an explanatory diagram showing an enlarged cross-sectional view of a track portion of the disc for the video camera provided by the embodiment.
FIG. 2B is an explanatory diagram showing an enlarged top view of the track portion of the disc for the video camera provided by the embodiment.

FIGS. 1, 2A and 2B are diagrams each conceptually showing a typical track structure of a disc conforming with the MD-DATA2 format. FIGS. 2A and 2B are enlarged cross-sectional and top-view diagrams showing a portion enclosed by a dashed line A in FIG. 1.

As shown in the figures, 2 kinds of groove are created on the surface of the disc. The 2 kinds of groove are a wobbled groove WG with wobbling and a non-wobbled groove NWG with no wobbling. A land Ld is created between a wobbled groove WG and non-wobbled groove NWG.

In the MD-DATA2 format, a land Ld is utilized as a recording track. Since a wobbled groove WG and a non-wobbled groove NWG are created as described above, a track Tr•A and a track Tr•B are 2 recording tracks which are independent of each other to provide a double-spiral shape.

A wobbled groove WG and a non-wobbled groove NWG are placed respectively on the disc-outer-circumference side and the disc-inner-circumference side of the track Tr•A.

As opposed to the track Tr•A, a wobbled groove WG and a non-wobbled groove NWG are placed respectively on the disc-inner-circumference side and the disc-outer-circumference side of the track Tr•B.

That is to say, only one surface on the disc-outer-circumference side of the track Tr•A and only one surface on the disc-inner-circumference side of the track Tr•B are wobbled.

In this case, a track pitch is thus a distance between the centers of a track Tr•A and a track Tr•B which are adjacent to each other. As shown in FIG. 2B, the track pitch is 0.95 microns.

Wobbling provided on a wobbled groove WG is created by a signal conveying physical addresses on the disc which are encoded in the signal by FM modulation and bi-phase modulation. Thus, in a recording or playback operation, playback information from wobbling provided on a wobbled groove WG is demodulated to extract physical addresses on the disc.

In addition, address information recorded in wobbling provided on a wobbled groove WG is effective for and common to the tracks Tr•A and Tr•B. That is to say, the tracks Tr•A and Tr•B placed respectively on the inner and outer circumferences of the wobbled groove WG, sandwiching the wobbled groove WG, share the address information recorded in wobbling provided on the wobbled groove WG. In a recording operation, the same addresses are recorded into land tracks Ld, that is tracks Tr•A and Tr•B, which are adjacent to a wobbled groove WG.

An addressing system like the one described above is referred to as an interlace addressing system. This is because, when the disc structure is seen from grooves, wobbled grooves WG having address information are placed on every other circumference so as to sandwich a non-wobbled groove NWG. Thus, a disc conforming to this embodiment is referred to hereafter as an interlace-addressing disc.

By adopting this interlace addressing system, cross-talk between adjacent wobbled shapes can be suppressed so that the track pitch can be decreased. A system to record addresses by creation of wobbling on a groove is referred to as an ADIP (Address In Pregroove) system.

The following description explains how to recognize which of the tracks Tr•A and Tr•B sharing common address information as described above is being traced.

Assume that a 3-beam system is adopted to implement a conceivable tracing system wherein a main beam is used for tracing a track implemented by a land Ld while the remaining 2 side beams are used for tracing grooves on both sides of the track being traced by the main beam.

To put it concretely, a main-beam spot SPm is tracing a track Tr•A as shown in FIG. 2B. Two side-beam spots SPs1 and SPs2 are placed on the inner and outer circumferences of the track Tr•A respectively. In this case, the side-beam spot SPs1 is tracing a non-wobbled groove NWG while the side-beam spot SPs2 is tracing a wobbled groove WG.

In another case not shown in the figure, a main-beam spot SPm is tracing a track Tr•B. In this case, the side-beam spot SPs1 is tracing a wobbled groove WG while the side-beam spot SPs2 is tracing a non-wobbled groove NWG.

As described above, when the track traced by the main-beam spot SPm is switched from the track Tr•A to the track Tr•B or vice versa, the track traced by the side-beam spot SPs1 is inevitably switched from a non-wobbled groove NWG to a wobbled groove WG and vice versa while the track traced by the side-beam spot SPs2 is unavoidably switched from a wobbled groove WG to a non-wobbled groove NWG and vice versa.

A detection signal generated at a photo detector as a result of reflection of the side-beam spot SPs1 or SPs2 has a waveform which varies in dependence on whether a wobbled groove WG or a non-wobbled groove NWG is being traced. Thus, the detection signal can be used to form a judgment as to whether for example the side-beam spot SPs1 (or SPs2) is currently tracing a wobbled groove WG or a non-wobbled groove NWG. The result of the judgment in turn indicates whether the main-beam spot SPm is tracing a track Tr•A or Tr•B.

FIG. 3 is a diagram showing comparison of main specifications of the MD-DATA2 format having the track structure described above with main specifications of the MD-DATA1 format.

First of all, in the case of the MD-DATA1 format, the track pitch is 1.6 microns, the pit length is 0.59 microns/bit, the laser wavelength λ is 780 nm and the numerical aperture NA of the optical head is 0.45.

A groove recording system is adopted as a recording technique. In the groove recording system, a groove is used as a recording/playback track.

As an addressing system, a system utilizing wobbled grooves is adopted. As described earlier, a wobbled groove is provided with wobbling for recording address information on each side of the wobbled. The wobbled groove (track) is formed to have a single spiral shape.

As a technique to modulate data to be recorded, an EFM (8–14 Modulation) system is adopted. As an error correction technique, an ACIRC (Advanced Cross Interleave Reed-Solomon Code) is used. A convolution type is adopted for data interleaving. For this reason, redundancy of data is 46.3%.

In the MD-DATA1 format, a CLV (Constant Linear Velocity) method is adopted. The linear velocity of the CLV method is set at 1.2 m/s.

The standard data rate for recording/playback operations is set at 133 kB/s. The recording capacity is 140 MB.

In the case of the MD-DATA2 format suitable for the present video camera, on the other hand, the track pitch is 0.95 microns and the pit length is 0.39 microns/bit. It is obvious that both the track pitch and the pit length are shorter than the MD-DATA1 format. In order to realize the pit length, typically, the laser wavelength λ is set at 650 nm and the numerical aperture NA of the optical head is set at 0.52 to squeeze the diameter of the beam spot at the focal point and to broaden the band of the optical system.

As a recording technique and an addressing method, the land recording system and the interlace addressing system explained earlier by referring to FIGS. 1 and 2 are adopted respectively. As a technique to modulate data to be recorded, an Run Length Limited (1,7) system is adopted. The Run Length Limited (1,7) system which is abbreviated to merely the RLL (1,7) system is suitable for high-density recording. An RS-PC system is adopted as an error correction method. A block termination type is adopted for data interleaving. As a result of adopting the systems described above, the redundancy of data can be suppressed to 19.7%.

Also in the MD-DATA2 format, a CLV (Constant Linear Velocity) method is adopted as well. However, the linear velocity of the CLV method is set at 2.0 m/s. The standard data rate for recording/playback operations is set at 589 kB/s. As a result, a recording capacity of 650 MB can be obtained. Recording at a recording density of 4 times that of the MD-DATA1 format can thus be implemented.

Assume that a moving picture is recorded in the MD-DATA2 format. In this case, if the data of the moving picture is compressed and encoded in accordance with the MPEG2 system, a moving picture with an amount equivalent to 15 minutes to 17 minutes can be recorded. Of course, the amount of data that can be recorded depends on the bit rate of the encoded data. In the case of recording only data of an audio signal, on the other hand, if the audio data is compressed and processed in accordance with the ATRAC2 (Adaptive Transform Acoustic Coding 2) system, data of an amount equivalent to about 10 hours can be recorded.

2. Internal Configuration of the Video Camera

Figure 4:
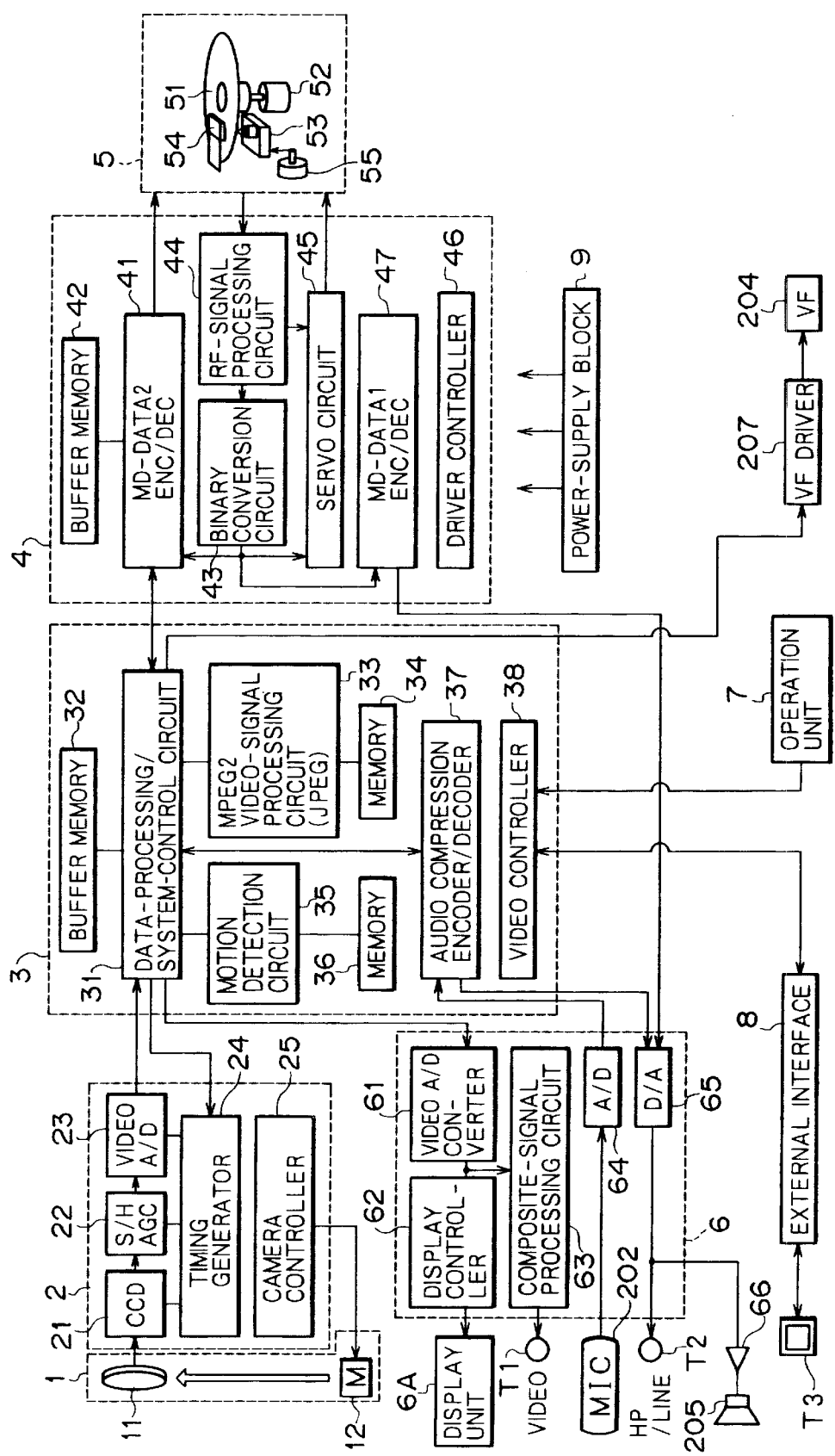
FIG. 4 is a block diagram showing the internal configuration of the video camera provided by the embodiment.

FIG. 4 is a block diagram showing a typical internal configuration of the present video camera.

A lens block 1 shown in this figure includes an optical system 11 typically having an actual photographing lens and an actual diaphragm. The lens blocks 1 also has a motor unit 12 which includes a focus motor for carrying out an auto-focus operation and a zoom motor for driving a zoom lens.

A camera block 2 includes a circuit for converting a light of a picture taken by the lens block 1 into a digital picture signal.

An optical picture of a photographed object passes through the optical system 11 and is supplied to a CCD (Charge Coupled Device) 21 employed in the camera block 2. In the CCD 21, the optical picture is subjected to opto-electrical conversion to generate an image-pickup signal which is supplied to a sample-hold/AGC (Automatic Gain Control) circuit 22. In the sample-hold/AGC circuit 22, the image-pickup signal received from the CCD 21 is subjected to gain adjustment and sample-hold processing to reshape the waveform. An analog signal output by the sample-hold/AGC circuit 22 is supplied to a video A/D converter 23 to be converted into digital picture signal data.

Signal processing timings of the CCD 21, the sample-hold/AGC circuit 22 and the video A/D converter 23 are controlled by timing signals generated by a timing generator 24. The timing generator 24 inputs a clock signal used in signal processing carried out by a data-processing/system-control circuit 31. As will be described later, the data-processing/system-control circuit 31 is employed in a video-signal processing circuit 3. The generation of the necessary timing signals by the timing generator 24 is based on the input clock signal. By generation of the timing signals based on the input signal of the video-signal processing circuit 3, the signal processing timings of the camera block 2 are synchronized with processing timings of a video-signal processing unit 3 employing the data-processing/system-control circuit 31.

A camera controller 25 executes necessary control so that each functional circuit employed in the camera block 2 operates properly. The camera controller 25 also executes control of operations such as auto focusing, automatic exposure adjustment, diaphragm adjustment and zooming of the lens block 1.

In the case of the auto focusing control, the camera controller 25 controls a rotational angle of the focus motor on the basis of focus control information obtained in accordance with a predetermined auto focusing control system. By controlling the rotational angle of the focus motor employed in the camera controller 25, the photographing lens can be driven to a just-point state.

In a recording operation, the video-signal processing unit 3 compresses the digital picture signal received from the camera block 2 and a digital audio signal picked up and supplied by a microphone 202. These pieces of compressed data are then supplied to a media drive unit 4 provided at the following stage as user recorded data. In addition, the digital picture signal received from the camera block 2 and a picture created from a character picture are supplied by the video-signal processing unit 3 to a view-finder drive unit 207 to be displayed on a view finder 204.

In a playback operation, on the other hand, the video-signal processing unit 3 demodulates user playback data received from the media drive unit 4 to generate a reproduced picture signal and a reproduced audio signal. Read out from a disc 51, the user playback data comprises compressed picture signal data and compressed audio signal data.

It should be noted that, in this embodiment, as a compression/decompression processing technique for compressing and decompressing picture signal data or picture data, an MPEG (Moving Picture Experts Groove; a trademark) 2 system is adopted for moving pictures and a JPEG (Joint Photographic Coding Experts Groove, a trademark) system is adopted for static pictures. On the other hand, as a compression/decompression processing technique for compressing and decompressing audio signal data, an ATRAC (Adaptive Transform Acoustic Coding, a trademark), ATRAC2 (Adaptive Transform Acoustic Coding 2, a trademark), MPEG Audio Layer 3 (a trademark), MPEG2 AAC (Moving Picture Expert Groove 2 Advanced Audio Coding, a trademark), Twin VQ (Transform-Domain Weighted Interleave Vector Quantization, a trademark) or MS Audio (Microsoft Media Audio, a trademark) system is adopted.

The data-processing/system-control circuit 31 employed in the video-signal processing unit 3 mainly executes control of processing to compress and decompress picture signal data and audio signal data in the video-signal processing unit 3 and carries out processing to input and output data to and from the video-signal processing unit 3.

Control of the whole video-signal processing unit 3 including the data-processing/system-control circuit 31 is executed by a video controller 38. The video controller 38 has a configuration typically including a microcomputer. The video controller 38 is capable of communicating with the camera controller 25 employed in the camera block 2 and a driver controller 46 employed in the media drive unit 4 to be described later typically through a bus line which is not shown in the figure.

As a basic recording operation of the video-signal processing unit 3, the picture signal data generated by the video A/D converter 23 employed in the camera block 2 is supplied to the data-processing/system-controller circuit 31. The data-processing/system-controller circuit 31 passes on the picture signal data received from the A/D converter 23 typically to a motion detection circuit 35. The motion detection circuit 35 carries out picture processing such as motion compensation for the picture signal data received from,the data-processing/system-controller circuit 31 by using typically a memory 36 as a work area. Data obtained as a result of the picture processing is then supplied to an MPEG2-video-signal processing circuit 33.

The MPEG2-video-signal processing circuit 33 compresses picture signal data supplied thereto in accordance with an MPEG2 format by using typically a memory 34 as a work area and outputs a bit stream (strictly speaking, an MPEG2 bit stream) of compressed data representing a moving picture. The MPEG2-video-signal processing circuit 33 typically has a configuration also for extracting picture data of a static picture from picture signal data of a moving picture and compresses the picture data to generate compressed picture data of a static picture in accordance with a JPEG format. It should be noted that, instead of adopting the JPEG format, an MPEG2 format can be used as a format of compressed picture data. In this case, it is conceivable to treat an I picture (Intra Picture) of regular picture data as picture data of a static picture.

The picture signal data compressed and encoded by the MPEG2-video-signal processing circuit 33 (that is, the compressed picture data) is typically written into a buffer memory 32 at a predetermined transfer rate to be stored therein temporarily.

It should be noted that the MPEG2 format supports both the CBR (Constant Bit Rate) and the VBR (Variable Bit Rate) as the so-called encoding bit rate (or data rate) as is generally known. The video-signal processing unit 3 is also designed to support these data rates.

When pictures are compressed at the VBR, for example, the motion detection circuit 35 typically detects a motion from picture data in a range of several tens to several hundreds of preceding and succeeding frames in macroblock units. If existence of a motion is detected, the result of the detection is supplied to the MPEG2-video-signal processing circuit 33 as motion-vector information.

The MPEG2-video-signal processing circuit 33 determines a quantization coefficient for each macroblock by utilizing necessary information including mainly the motion-vector information so as to set the rate of picture data after the compression encoding at a required data rate.

An analog audio signal picked up by typically the microphone 202 is converted by an A/D converter 64 employed in a display/picture/sound input-output unit 6 into digital audio signal data which is then supplied to an audio compression encoder/decompression decoder 37.

The audio compression encoder/decompression decoder 37 compresses the digital audio signal data received from the A/D converter 64 in accordance with the ATRAC2 format described above. The compressed audio signal data is written into the buffer memory 32 at a predetermined transfer rate by the data-processing/system-controller circuit 31 to be stored therein temporarily.

As described above, the buffer memory 32 can be used for accumulating compressed picture data and compressed audio signal data. The buffer memory 32 performs a function to absorb a difference in transfer rate between data transferred between the display/picture/sound input/output unit 6 or the camera block 2 and the buffer memory 32 and data transferred between the buffer memory 312 and the media drive unit 4.

Pieces of compressed picture data and compressed audio signal data accumulated in the buffer memory 32 are read out sequentially with predetermined timings and transferred to an MD-DATA2 encoder/decoder 41 employed in the media drive unit 4 in a recording operation. It should be noted, however, that in a playback operation, for example, the operation to read out accumulated data from the buffer memory 32 and the operation to transfer the read-out data from the media drive unit 4 to the disc 51 by way of a deck unit 5 can be carried out intermittently.

The operations to write and read out data into and from the buffer memory 32 are controlled typically by the data-processing/system-controller circuit 31.

An overview of the playback operation carried out in the video-signal processing unit 3 is described as follows.

In a playback operation, user playback data is supplied to the data-processing/system-controller circuit 31. The user playback data is obtained as a result of reading out compressed picture data and compressed audio signal data from the disc 51 and decoding the data by using the MD-DATA2 encoder/decoder 41 employed in the media drive unit 4 in accordance with the MD-DATA2 format.

The data-processing/system-controller circuit 31 temporarily stores the compressed picture data and the compressed audio signal data supplied thereto typically in the buffer memory 32. The compressed picture data and the compressed audio signal data are read out back by the data-processing/system-controller circuit 31 from the buffer memory 32 at a predetermined transfer rate and with predetermined timing so as to typically establish time-axis matching for the playback operation. The compressed picture data is supplied to the MPEG2-video-signal processing circuit 33 and the compressed audio signal data is supplied to the audio compression encoder/decompression decoder 37.

The MPEG2-video-signal processing circuit 33 decompresses the compressed picture data supplied thereto and supplies the decompressed data to the data-processing/system-controller circuit 31. The data-processing/system-controller circuit 31 passes on the decompressed picture signal data to a video D/A converter 61 employed in the display/picture/sound input/output unit 6.

In the mean time, the audio compression encoder/decompression decoder 37 decompresses the compressed audio signal data supplied thereto and supplies the decompressed data to a D/A converter 65 employed in the display/picture/sound input/output unit 6.

In the display/picture/sound input/output unit 6, the video D/A converter 61 converts the picture signal data received from the data-processing/system-controller circuit 31 into an analog picture signal which is then split to a display controller 62 and a composite-signal processing circuit 63.

The display controller 62 drives a display unit 6A in accordance with the analog picture signal received from the video D/A converter 61. As a result, a picture is displayed on the display unit 6A. The display unit 6A can be used for not only displaying a picture played back from the disc 51 but, as a matter of course, is also capable of outputting and displaying a picture of a photographing object taken by a camera member on an all but real-time manner. By the camera member, the lens block 1 and the camera block 2 are meant.

In addition to a reproduced picture and a taken picture, the display unit 6A is also used for displaying a message according to the operation of the equipment as described above. The message is typically a string of characters for notifying the user of information. In an operation to display a message on the display unit 6A, the video controller 38 typically controls processing to synthesize picture signal data such as a necessary string of characters with picture signal data to be output from the data-processing/system-controller circuit 31 to the video D/A converter 61 so that the string of characters or the like is displayed at a predetermined position.

The composite-signal processing circuit 63 converts the analog picture signal received from the video D/A converter 61 into a composite signal and outputs the composite signal to a video output terminal T1. Typically, the video output terminal T1 is connected to an external monitor apparatus. In this case, a picture played back by the present video camera can be displayed on the external monitor apparatus.

In the display/picture/sound input/output unit 6, audio signal data is supplied by the audio compression encoder/decompression decoder 37 to the D/A converter 65 to be converted into an analog audio signal which is then output to a headphone/line terminal T2. The analog audio signal produced by the D/A converter 65 is also supplied to a speaker 205 by way of an amplifier 66. The speaker 205 then outputs a reproduced sound and the like.

In a recording operation, the media drive unit 4 encodes data to be recorded in accordance with the MD-DATA2 format so as to make the data suitable for the disc recording and supplies the encoded data to the deck unit 5. In a playback operation, on the other hand, data read out from the disc 51 in the deck unit 5 is decoded to produce playback data which is then supplied to the video-signal processing unit 3.

In a recording operation, the MD-DATA2 encoder/decoder 41 employed in the media drive unit 4 inputs data to be recorded from the data-processing/system-controller circuit 31 and carries out a predetermined encoding process according to the MD-DATA2 format on the data to be recorded. The encoded data is temporarily stored in a buffer memory 42. The encoded data is then read out back by the MD-DATA2 encoder/decoder 41 from the buffer memory 42 with proper timing and supplied to the deck unit 5.

In a playback operation, a digital playback signal read out from the disc 51 and transferred through an RF-signal processing circuit 44 and a binary conversion circuit 43 is subjected to a decoding process according to the MD-DATA2 format in the MD-DATA2 encoder/decoder 41 and then supplied to the data-processing/system-controller circuit 31 employed in the video-signal processing unit 3 as playback data.

It should be noted that, also in this case, the playback data is stored by the MD-DATA2 encoder/decoder 41 temporarily in the buffer memory 42 if necessary. The playback data is then read out from the buffer memory 42 with proper timing and supplied back to the data-processing/system-controller circuit 31. The operations to store and read out playback data into and from the buffer memory 42 are controlled by a driver controller 46.

It is worth noting that, in an operation to play back data from the disc 51, for example, when the servo is disturbed by an external disturbance or the like so that it becomes impossible to read out a signal from the disc 51, the operation to read out data accumulated in the buffer memory 42 is continued. If the operation to play back data from the disc 51 can be resumed before all data accumulated in the buffer memory 42 is read out, the continuity of the playback data along the time axis can be sustained.

The RF-signal processing circuit 44 carries out necessary processing on the signal read out from the disc 51 to generate for example an RF signal as playback data and a variety of servo control signals such as a focus-error signal and a tracking-error signal used in servo control of the deck unit 5. The RF signal is converted into binary data by the binary conversion circuit 43 as described above and supplied to the MD-DATA2 encoder/decoder 41 as digital signal data.

The servo control signals generated by the RF-signal processing circuit 44 are supplied to a servo circuit 45 for executing necessary control of the deck unit 5 based on the servo control signals received from the RF-signal processing circuit 44.

It should be noted that this embodiment is provided with an encoder/decoder 47 conforming to the MD-DATA1 format. The encoder/decoder 47 is capable of encoding data for recording received from the video-signal processing unit 3 in accordance with the MD-DATA1 format and recording the encoded data into the disc 51. The encoder/decoder 47 is also capable of decoding data encoded in accordance with the MD-DATA1 format and read out from the disc 51, and supplying the decoded data to the video-signal processing unit 3 or the display/picture/sound input/output unit 6. That is to say, the present video camera has a configuration that provides compatibility between the MD-DATA1 format and the MD-DATA2 format.

The driver controller 46 is a functional circuit unit for controlling the media drive unit 4 as a whole.

The deck unit 5 is a member having a function to drive the disc 51. The deck unit 5 also has a mechanism that includes a function allowing the user to carry out an operation to replace a disc 51 mounted on the deck unit 5 with another disc 51 to be mounted on the deck unit 5 by dismounting the former and mounting the latter from and on the deck unit 5 even though this configuration is not shown explicitly in the figure. This mechanism is referred to as a disc slot. The disc 51 is assumed to be a magneto-optical disc with the MD-DATA2 format or the MD-DATA1 format.

The deck unit 5 is driven to into rotation by a spindle motor 52 at a CLV to drive the disc 51 mounted on the deck unit 5 into rotation at the CLV. A laser beam is radiated to the disc 51 by an optical head 53 in a recording or playback operation.

In a recording operation, the optical head 53 outputs a laser beam at a high level for heating a recording track to the Curie temperature. In a playback operation, on the other hand, the optical head 53 outputs a laser beam at a relatively low level for detecting data from a light reflected by a magnetic Kerr effect. For this reason, the optical head 53 is provided with an optical system and a detector for detecting a reflected laser beam. The optical system includes a laser diode serving as laser outputting means, a polarization beam splitter and an objective lens. It should be noted that details of the configuration of the optical head 53 are shown in none of the figures. The objective lens employed in the optical head 53 is supported by typically a biaxial mechanism which is capable of displacing the lens in the radial direction of the disc 51 and a direction approaching and departing from the disc 51.

Another magnetic head 54 is provided on the other side of the disc 51 at a counterpart position of the position of the optical head 53, sandwiching the disc 51 in conjunction with the optical head 53. The magnetic head 54 applies a magnetic field modulated by data being recorded to the disc 51.

In addition, the deck unit 5 is also provided with a sled mechanism driven by a sled motor 55. It should be noted that the sled mechanism itself is not shown in the figure. By driving the sled mechanism, the optical head 53 as a whole and the magnetic head 54 can be moved in the radial direction of the disc 51.

An operation unit 7 has operators to be operated for carrying out a variety of operations on the present video camera including operations related to video-recording and playback processing. Various kinds of operation information entered by the user via the operators are supplied to the video controller 38. In accordance with an operation carried out by the user, the video controller 38 provides the camera controller 25 and the driver controller 46 with operation information and control information so that necessary operations according to the user operation are carried out by the components.

An external interface 8 allows the present video camera to exchange data with an external apparatus. Typically, the external interface 8 is provided between an I/F terminal T3 and the video-signal processing unit 3 as shown in the figure. It should be noted that the external interface 8 typically conforms to the IEEE1394 specifications even though it is not limited thereto.

Assume that an external digital picture apparatus is connected to this present video camera through this I/F terminal T3. In this case, a picture or a sound taken by the video camera can be recorded into the external digital picture apparatus. On the contrary, picture or audio data or the like played back by the external digital picture apparatus can be input by way of the external interface 8 and recorded into the disc 51 in accordance with the MD-DATA2 (or MD-DATA1) format. In addition, it is also possible to input and record a file containing character information to be inserted typically as a caption.

A power-supply block 9 supplies power-supply voltages at levels proper for the functional circuit units. The power-supply voltages are generated from a direct-current power supply which is implemented by an embedded battery or derived from the commercial alternating-current power supply. The power-supply block 9 is turned on and off under control executed by the video controller 38 in accordance with an operation carried out on a power-supply or the like provided typically on the main unit.

3. Configuration of the Media Drive Unit

FIG. 4 is a block diagram showing a detailed configuration of each MD-DATA2 functional circuit component employed in the media drive unit 4.

Figure 5:
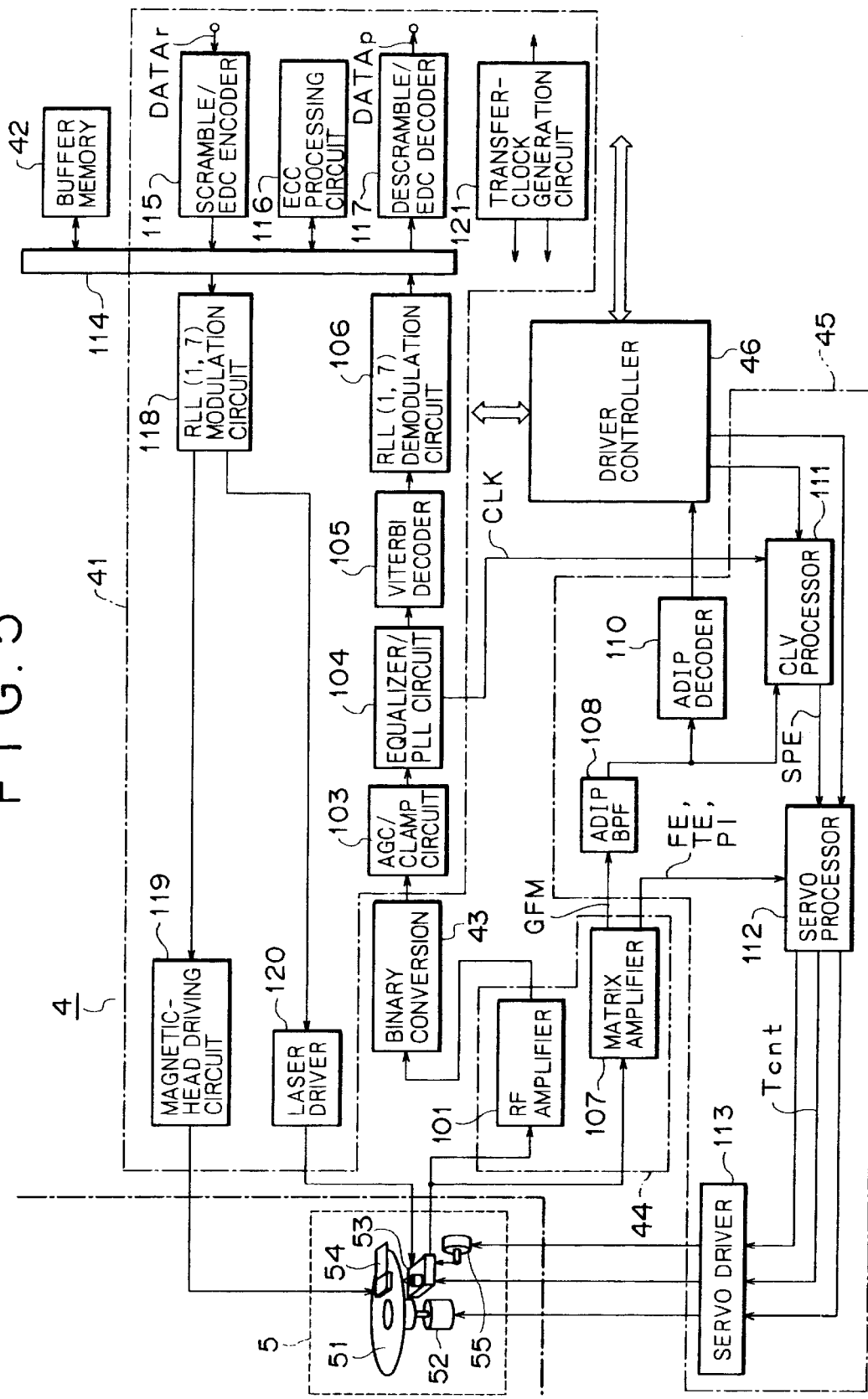
FIG. 5 is a block diagram showing the internal configuration of a media drive unit employed in the video camera provided by the embodiment.

The circuit configurations shown in FIG. 5 correspond to the disc drive apparatus implemented by the embodiment.

It should be noted that, while FIG. 5 shows the deck unit 5 along with the media drive unit 4, components employed in the internal configuration of the deck unit 5 are denoted by the same reference numerals used in FIG. 4 and their explanation is not repeated. By the same token, components employed in the media drive unit 4 shown in FIG. 5 are denoted by the same reference numerals used in the range corresponding to the same block shown in FIG. 4.

Information detected from data read out by the optical head 53 from the disc 51 is supplied to an RF amplifier 101 employed in the RF-signal processing circuit 44. To put it concretely, the detected information is an optical current obtained by a photo detector as a result of detection of a reflected laser beam.

From the detected information supplied to the RF amplifier 101, a playback RF signal is generated as a playback signal and supplied to the binary conversion circuit 43. The binary conversion circuit 43 converts the playback RF signal supplied thereto into binary data, generating a digital playback RF signal which is also referred to as a binary RF signal.

The binary RF signal is supplied to the MD-DATA2 encoder/decoder 41. First of all, in the MD-DATA2 encoder/decoder 41, the binary RF signal is subjected to processes such as gain adjustment and clamp processing in an AGC/clamp circuit 103. Then, the binary RF signal output by the AGC/clamp circuit 103 is supplied to an equalizer/PLL circuit 104.

In the equalizer/PLL, circuit 104, the binary RF signal is subjected to an equalizing process before being output to a Viterbi encoder 105. The binary RF signal completing the equalizing process in the equalizer/PLL circuit 104 is supplied to a PLL circuit to extract a clock signal CLK synchronized with the binary RF signal (an RLL (1, 7) code train).

The frequency of the clock signal CLK corresponds to the rotational speed of the disc 51. In order to rotate the disc 51 at a rotational speed indicated by the frequency of the clock signal CLK, a CLV processor 111 inputs the clock signal CLK generated by the equalizer/PLL circuit 104 and compares the frequency thereof with a reference value representing a predetermined CLV shown in FIG. 3. An error obtained as a result of the comparison is used as a signal component for generating a spindle-error signal SPE. The clock signal CLK is also used as a clock for processing in some signal-processing circuit systems including mainly an RLL (1, 7) demodulation circuit 106.

The Viterbi decoder 105 decodes the binary RF signal received from the equalizer/PLL circuit 104 in accordance with the so-called Bitabi decoding technique to produce an RLL (1, 7) code train as playback data from the decoding process.

The playback data is supplied to the RLL (1, 7) demodulation circuit 106. In the RLL (1, 7) demodulation circuit 106, the playback data is subjected to an RLL (1, 7) demodulation process to generate a data stream.

The data stream obtained as a result of the demodulation process in the RLL (1, 7) demodulation circuit 106 is written into the buffer memory 42 through a data bus 114 to be expanded in the buffer memory 42.

First of all, the data stream expanded in the buffer memory 42 in this way is subjected to error correction processing in an ECC processing circuit 116 in error-correction block units in accordance with an RS-PC system. Data generated by the ECC processing circuit 116 is then subjected to descramble processing and an EDC decoding process (that is, error detection processing) in a descramble/EDC decoder circuit 117.

Data completed the pieces of processing described above is referred to as playback data DATAp. The playback data DATAp is then transferred from the descramble/EDC decoder circuit 117 typically to the data-processing/system-controller circuit 31 employed in the video-signal processing unit 3 at a transfer rate determined by a transfer clock signal generated by a transfer-clock generation circuit 121.

The transfer-clock generation circuit 121 is a member for generating a transfer clock signal having a properly and correctly set frequency for determining a data transfer rate. The transfer clock signal is a signal for transferring data between the media drive unit 4 and the video-signal processing unit 3 as well as between functional circuits in the media drive unit 4.

In addition, in accordance with the operating state of the present video camera, the transfer-clock generation circuit 121 also generates a clock signal with a proper frequency to be supplied to functional circuits employed in the video-signal, processing unit 3 and the media drive unit 4.

Detection information read out by the optical head 53 from the disc 51 is supplied to a matrix amplifier 107.

In the matrix amplifier 107, the detection information supplied by the optical head 53 is subjected to necessary processing to generate data including a tracking-error signal TE, a focus-error signal FE, groove information GFM and a pull-in signal PI which are supplied to an extract servo circuit 45. Groove information is address information recorded on a wobbled groove WG on the disc 51.

To be more specific, the tracking-error signal TE and the focus-error signal FE are supplied to a servo processor 112. On the other hand, the groove information GFM is supplied to an ADIP-band-pass filter 108.

The GFM information is subjected to band limitation processing in the ADIP band filter 108 before being supplied to an ADIP decoder 110 and the CLV processor 111.

The ADIP decoder 110 decodes the groove information GFM received from the ADIP band filter 108 to extract an ADIP signal which represents information on absolute addresses on the disc 51. The ADIP signal is supplied to the driver controller 46. The driver controller 46 executes necessary control based on the track identification information described earlier and the ADIP signal.

The CLV processor 111, receives the clock signal CLK from the equalizer/PLL circuit 104 and the groove information GFM from the ADIP band filter 108. The CLV processor 111 generates a spindle-error signal SPE for executing CLV servo control and supplies the spindle-error signal SPE to the servo processor 112. The generation of the spindle-error signal SPE is based on an error signal obtained typically as a result of integration of differences in phase between the groove information GFM and the clock signal CLK. It should be noted that necessary operations to be carried out by the CLV processor 111 are controlled by the driver controller The servo processor 112 generates a variety of servo control signals such as a tracking control signal Tcnt, a focus control signal, a sled control signal and a spindle control signal, outputting the servo control signals to a servo driver 113. The generation of the servo control signals is based on, among other information, the tracking-error signal TE, the focus-error signal FE, the spindle-error signal SPE, a track jump command and an access command. The track jump command and the access command are received from the driver controller 46.

The servo driver 113 generates necessary servo drive signals based on the servo control signals received from the servo processor 112. The servo drive signals are biaxial drive signals for driving the biaxial mechanism, a sled-motor drive signal for driving a sled mechanism and a spindle-motor drive signal for driving the spindle motor 52. The biaxial drive signals consist of a signal in the focus direction and a signal in the tracking direction.

The servo drive signals are supplied to the deck unit 5 to execute focus control and tracking control of the disc 51 and to execute CLV control of the spindle motor 52.

In an operation to record user data DATAr into the disc 51, the user data DATAr to be recorded is supplied by the data-processing/system-controller circuit 31 employed in the video-signal processing unit 3 to the scramble/EDC encoder circuit 115. The user data DATAr to be recorded is supplied to the scramble/EDC encoder circuit 115 synchronously with a transfer clock signal (or a data transfer rate signal) generated by a transfer-clock generation circuit 121.

In the scramble/EDC encoder circuit 115, the data DATAr to be recorded is expanded in the buffer memory 42 to be subjected to data scramble processing and an EDC encoding process. The EDC encoding process is processing to add an error detection code according to a predetermined system. Data completed the pieces of processing in the scramble/EDC encoder circuit 115 is then supplied typically to an ECC processing circuit 116 for adding an error detection code conforming to the RS-PC system to the user data DATAr expanded in the buffer memory 42.

The data DATAr completed the pieces of processing so far is then read out from the buffer memory 42 and supplied to an RLL (1, 7) modulation circuit 118 by way of the data bus 114.

In the RLL (1, 7) modulation circuit 118, the supplied data DATAr to be recorded is subjected to an RLL (1, 7) modulation process to generate an RLL (1, 7) code train as data to be recorded. This data is then output to a magnetic-head driving circuit 119.

By the way, in the case of the MD-DATA2 format, the so-called laser strobe magnetic-field modulation system is adopted as a technique for recording data into a disc. The laser strobe magnetic field modulation system is a recording system whereby a magnetic field modulated by data being recorded is applied to the recording surface of a disc and a laser beam to be radiated to the disc is emitted as pulses synchronized with the data being recorded.

In the laser strobe magnetic-field modulation system, a process of creating a pit edge to be recorded into a disc is not dependent on transient characteristics such as an inversion speed of the magnetic field but determined by radiation timing of the laser pulses.

For the reason described above, with the laser strobe magnetic-field modulation system, the edge of a recording pit can be made extremely small with ease in comparison with a simple magnetic-field modulation system for example. The simple magnetic-field modulation system is a system whereby a laser beam is radiated to a disc in a steady state and a magnetic field modulated by data being recorded is applied to the recording surface of the disc. That is to say, the laser strobe magnetic-field modulation system is a recording system advantageous in high-density recording.

The magnetic-head driving circuit 119 employed in the media drive unit 4 applies a magnetic field modulated by data being recorded from the magnetic head 54 to the recording surface of the disc 51. In addition, a clock signal is supplied by the RLL (1, 7) modulation circuit 118 to the laser driver 120 synchronously with the data being recorded. On the basis of the received clock signal, a laser driver 120 drives a laser diode employed in the optical head 53 so that laser pulses generated by the magnetic head 54 as a magnetic field in synchronization with the data being recorded are radiated to the disc 51. At that time, laser pulses output and emitted by the laser diode have the required laser power which is suitable for a recording operation. In this way, the present media drive unit 4 is capable of carrying out a recording operation according to the laser strobe magnetic-field modulation system.

4. Configuration of the Magnetic Head

As described earlier by referring to FIGS. 1 and 2, the disc for the video camera provided by this embodiment adopts the interlace addressing system. In addition, in order to form a judgment as to which track of a double-track spiral formed on the disc adopting the interlace addressing system is being traced, basically, a 3-beam method is adopted as a technique for detecting a tracking-error signal as has been described earlier.

As explained in the description of the conventional system, however, the configurations of an optical head based on the 3-beam method and a signal processing circuit (an RF amplifier) for such a head are complicated. Thus, the 3-beam method is not desirable if factors such as the miniaturization of circuits and the manufacturing efficiency are to be taken into consideration.

As a matter of fact, in a disc drive apparatus complying with the preceding MD-DATA1 format, the so-called 1-beam optical pickup conforming to a push-pull method employs the so-called laser coupler. A laser coupler is an integrated optical device comprising a laser diode, an optical system and a photo detector which are laid out on a substrate.

Taking what is described above as a background, the embodiment is designed into a configuration in which a laser coupler is employed in the optical head 53 and, in addition, by execution of tracking control to be described later, tracks Tr•A and Tr•B can be recognized correctly without adopting the 3-beam method so that a recording or playback operation can be carried out by tracing a target track.

First of all, the configuration of a laser coupler provided in the optical head 53 is explained.

Figure 6:
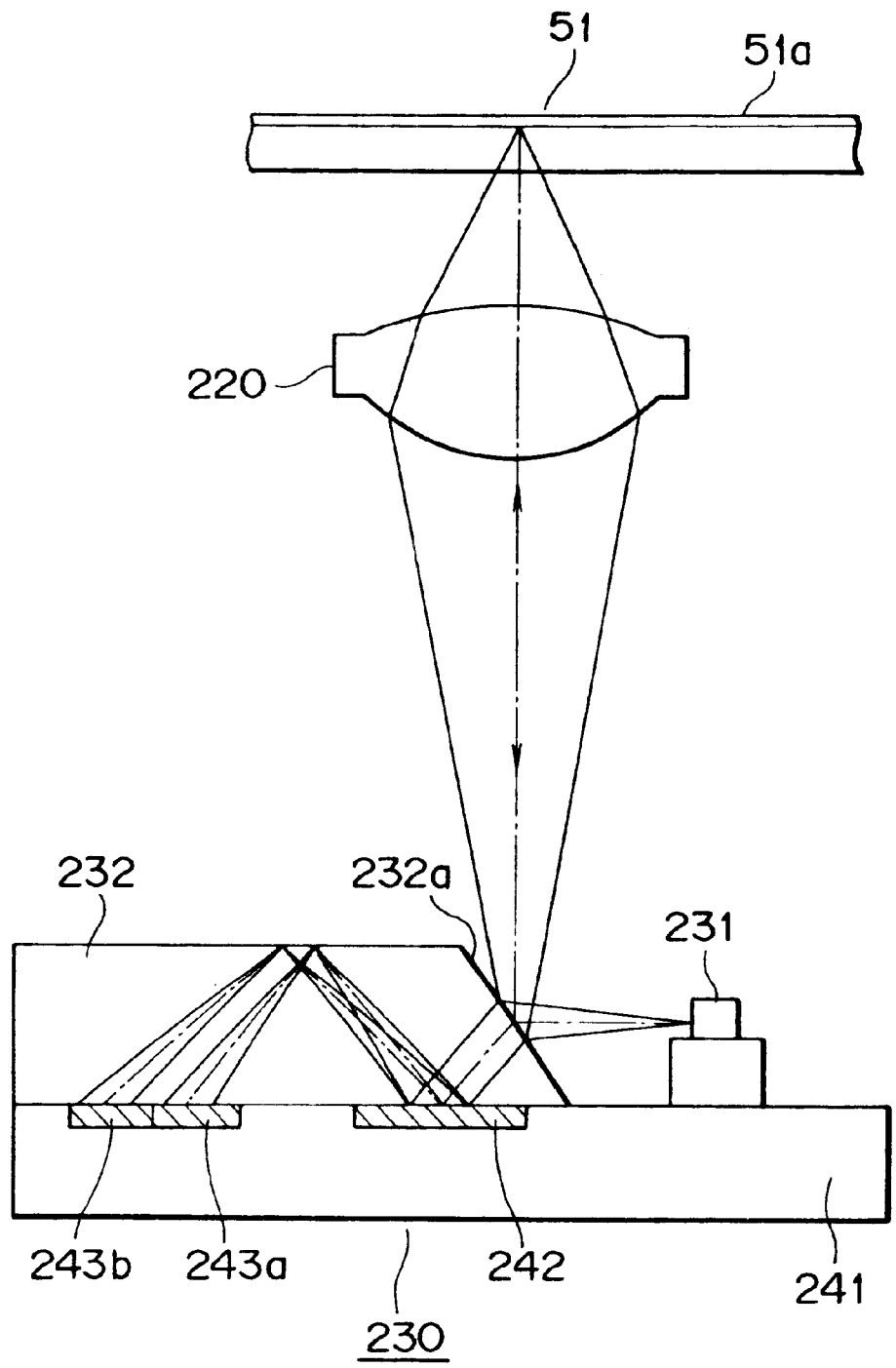
FIG. 6 is a diagram showing a side view of a typical configuration of a laser coupler provided by the embodiment.

FIG. 6 is a diagram showing a typical configuration of a laser coupler provided by the embodiment.

An optical system of the optical head 53 mainly comprises a laser coupler 230 and an objective lens 220. it should be noted that the objective lens 220 is supported by a biaxial mechanism not shown in the figure so that the lens 220 can be displaced in a focus direction and a radial direction of the disc 51. The focus direction is a direction approaching or departing from a signal surface 51a of the disc 51 and the radial direction is also referred to as a tracking direction.

As shown in FIG. 6, the laser coupler 230 comprises 3 photo detectors 242, 243a and 243b which are laid out on a silicon substrate 241. A microprism 232 also referred to hereafter simply as a prism 232 is provided to cover the photo detectors 242, 243a and 243b. A side of the prism 232 to which a laser beam is radiated is created as a slanting surface 232a forming a predetermined angle with a horizontal plane as shown in the figure. A laser diode 231 serving as a source of a laser beam is provided for radiating a laser beam to the slanting surface 232a of the prism 232 as shown in the figure.

The laser beam emitted by the laser diode 231 is reflected by the slanting surface 232a of the prism 232 to the disc 51 in a direction forming an angle of 90 degrees with the incident direction. The reflected laser beam is converged by the objective lens 220 and then radiated to the signal surface 51a of the disc 51 in a converged state.

Then, a beam reflected by the signal surface 51a hits the slanting surface 232a of the prism 232 through the lens 220.

The laser beam is split by the slanting surface 232a into typically 2 optical paths. First of all, the 2 split reflected laser beams are received by the photo detector 242. Then, the 2 split reflected laser beams received by the photo detector 242 are reflected by the photo detector 242 toward the top surface of the prism 232. on the top surface of the prism 232, a reflective film having a reflectance is created. Thus, the 2 split laser beams reflected by the photo detector 242 are again reflected by the reflective film on the top surface of the prism 232. The 2 split laser beams reflected by the reflective film on the top surface of the prism 232 are received by the photo detectors 243a and 243b respectively.

Figure 7:
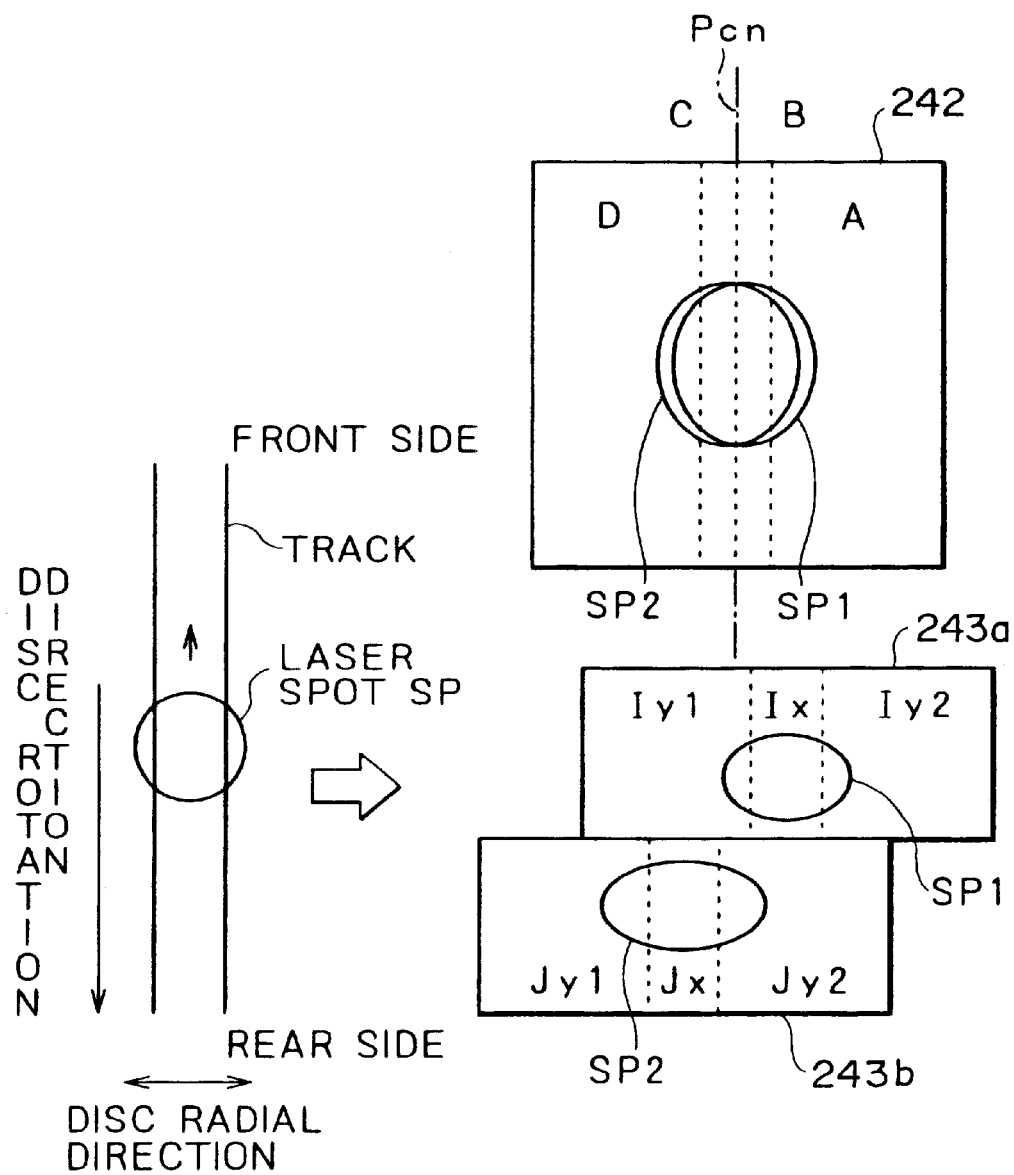
FIG. 7 is a diagram showing a typical configuration of photo detectors employed in the laser coupler provided by the embodiment.

FIG. 7 is a diagram conceptually showing a positional relation among the 3 photo detectors 242, 243a and 243b created on the laser coupler 230 and the structures of the photo detector s 242, 243a and 243b.

As shown in the figure, in the positional relation of the 3 photo detectors 242, 243a and 243b in the track direction (or the rotational direction of the disc 51), the 3 photo detectors 242, 243a and 243b are laid out sequentially one after another with the photo detectors 242, 243a and 243b placed at the front, in the middle and at the back in the onward direction of a laser spot SP along a track.

The photo detectors 243a and 243b are typically placed at positions adjacent to each other along the track direction. in the radial direction of the disc 51, however, the photo detectors 243a and 243b are shifted from each other in opposite directions with respect to the center position Pcn of the photo detector 242.

The photo detector 242 is divided into 4 detection areas A, B, C and D by dashed division lines parallel to the track direction. The photo detector 242 receives optical spots SP1 and SP2 of the 2 split laser beams reflected by the slanting surface 232a of the prism 232 as described earlier by referring to FIG. 6.

The photo detector 243a is divided into 3 detection areas Iy1, Ix and Iy2 by dashed division lines parallel to the track direction. By the same token, the photo detector 243b is divided into 3 detection areas Jy1, Jx and Jy2 by dashed division lines parallel to the track direction.

After being reflected by the photo detector 242, the 2 split laser beams are reflected by the reflective film on the top surface of the prism 232 and then received by the photo detectors 243a and 243b as optical spots SP1 and SP2 respectively.

Detection outputs obtained as a result of reception of the 2 split reflected laser beams by the detection areas A to D of the photo detector 242, the detection areas Iy1, Ix and Iy2 of the photo detector 243a and the detection areas Jy1, Jx and Jy2 of the photo detector 243b are properly supplied to the RF amplifier 101 and the matrix amplifier 107 shown in FIG. 5 as voltage signals. The RF amplifier 101 carries out necessary processing to generate typically a playback RF signal. The matrix amplifier 107 carries out necessary processing to generate a variety of servo-error signals.

It should be noted that, in the following description of this specification, detection signals obtained from the detection areas A to D of the photo detector 242 are denoted by symbols A to D respectively.

By the same token, detection signals obtained from the detection areas Ix, Iy1 and Iy2 of the photo detector 243a and the detection areas Jx, Jy1 and Jy2 of the photo detector 243b are denoted by the same symbols for denoting the detection areas ,namely, the symbols Ix, Iy1, Iy2, Jx, Jy1 and Jy2 respectively.

It should be noted, however, that in the following description, the detection signal Iy represents a signal expressed by:

Iy1+Iy2

By the same token, the detection signal Jy represents a signal expressed by:

Jy1+Jy2

5. Processing in the Matrix Amplifier and the RF Amplifier

In the matrix amplifier 107 explained earlier by referring to FIG. 5, the detection signals are obtained from the photo detectors 242, 243a and 243b of the optical head 53 to generate a variety of signals required in a recording or playback operation in the disc drive apparatus comprising the media drive unit 4 and the deck unit 5. For example, the generated signals include the pull-in signal PI, the focus-error signal FE, the tracking-error signal TE and the playback RF signal which are described earlier.

In generation of the pull-in signal PI, for instance, the pull-in signal PI is generated by the matrix amplifier 107 as a result of summation (A+B+C+D) where A to D denote the detection signals obtained from the detection areas A to D of the photo detector 242 respectively.

Figure 8:
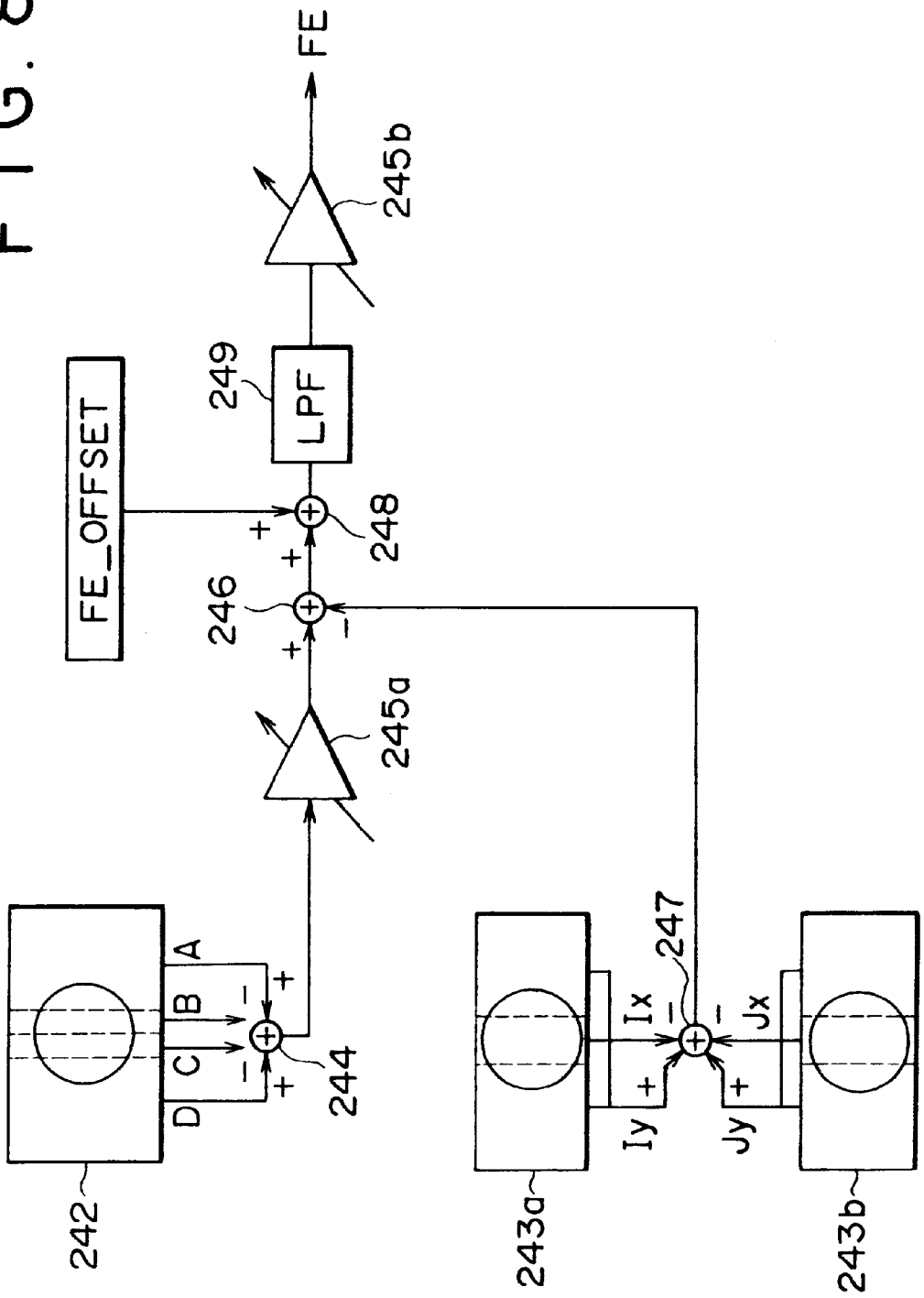
FIG. 8 is a block diagram showing the configuration of a focus-error-signal generation circuit provided by the embodiment.

In order to generate the focus-error signal FE, the matrix amplifier 107 is built as a focus-error-signal generation circuit with a configuration shown in FIG. 8.

In the focus-error-signal generation circuit shown in FIG. 8, the detection signals A to D generated by the photo detector 242 are supplied to a processor 244 for carrying out the following arithmetic calculation:

(A+D)−(B+C).

A difference obtained as a result of the arithmetic calculation is supplied to an amplifier 245a. In the amplifier 245a, a gain is adjusted before the result is output to an adder 246.

The detection signals Ix and Iy (=Iy1+Iy2) generated by the photo detector 243a as well as the detection signals Jx and Jy (=Jy1+Jy2) generated by the photo detector 243b are supplied to a processor 247 for carrying out the arithmetic calculation:

(Iy+Jy)−(Ix+Jx)

A difference obtained as a result of the arithmetic calculation is supplied to the adder 246.

The adder 246 subtracts the result of the arithmetic calculation generated by the processor 247 from the result of the arithmetic calculation generated by the processor 244. A difference obtained as a result of the subtraction output by the adder 246 is supplied to an adder 248 for adding the result of the subtraction to a predetermined value called a focus-error offset, that is, an offset from a target value. A sum obtained as a result of the addition by the adder 248 is then supplied to a low-pass filter (LPF) 249 for passing on only predetermined low-frequency-range components to a gain amplifier 245b. In the gain amplifier 245b, the gain is again adjusted to generate the focus-error signal FE.

The configuration of the focus-error-signal generation circuit shown in FIG. 8 generates a focus-error signal FE based on a phenomenon of changes in detection outputs produced by the photo detector 242 and the photo detector 243 comprising the photo detectors 243a and 243b. The phenomenon is observed when the objective lens 220 is moved in a direction approaching or departing from the disc 51 as shown for example in FIGS. 9A, 9B, 9C and 9D.

A signal Mα shown in FIG. 9C is the waveform of the difference (A+D)−(B+C) obtained as a result of the arithmetic calculation carried out by the processor 244 shown in FIG. 8 where the symbols A and D denote detection signals generated respectively by the detection areas A and D on the 2 outer sides of the photo detector 242 whereas the symbols B and C denote detection signals generated respectively by the detection areas B and C on the inner sides of the photo detector 242.

On the other hand, a signal Mij shown in FIG. 9C is the waveform of the difference (Iy+Jy)−(Ix+Jx) obtained as a result of the arithmetic calculation carried out by the processor 247 shown in FIG. 8 where the symbols Iy and Ix denote detection signals generated respectively by the detection areas Iy and Ix on the photo detector 243a whereas the symbols Jy and Jx denote detection signals generated respectively by the detection areas Jy and Jx on the photo detector 243b.

The change in signal Mα obtained from the photo detector 242 has a phase opposite to that of the change in signal Mij obtained from the photo detector 243 as is also obvious from the output waveform shown in FIG. 9C and convergence states of the optical spots shown in FIGS. 9A and 9B.

Thus, in the actual focus-error-signal generation circuit shown in FIG. 8, the adder 246 subtracts the signal Mij output by the processor 247 from the signal Mα output by the processor 244 to give a signal representing the actual focusing state as shown in FIG. 9D. The signal representing the actual focusing state is output as the focus-error signal FE.

Next, the configuration of a circuit for generating the tracking-error signal TE is explained. In this embodiment, by providing the laser coupler 230 having a configuration based on the 1-beam system shown in FIG. 6, a push-pull signal can be generated as a base for executing tracking-servo control.

As is generally known, the push-pull signal is a signal obtained by acquiring a difference in light intensity between 2 light reception areas resulting from dividing a photo detector along the track direction. Since the intensity of a light received by each of the light reception areas varies in accordance with diffraction by a groove (or a land) or a pit of the disc, the circuit makes use of the fact that the push-pull signal has a level corresponding to the magnitude of a tracking error. In this circuit, a tracking-error signal TE is generated in accordance with the level of the push-pull signal.

It should be noted, however, that a direct-current offset component is superposed on the push-pull signal as is generally known. The direct-current offset component may be the magnitude of a Shift of the objective lens 220 supported by the biaxial mechanism. The shift is from a center point position in the tracking direction in tracking control. The direct-current offset component may be the magnitude of a shift of a laser spot over the photo detector in the radial direction of the disc 51. This shift is caused by typically an inclination of the disc 51.

As described above, an offset component is superposed on the push-pull signal. Thus, if tracking-servo control is executed by the servo processor 112 by utilization of the push-pull signal obtained in the way described above as it is as a tracking-error signal, a track can not be traced correctly.

In order to solve the above problem, the offset component corresponding to the magnitude of a shift of a laser spot over the photo detector in the radial direction of the disc 51 is canceled from the push-pull signal in this circuit. Then, if tracking-servo control is executed by the servo processor 112 by utilization of the push-pull signal with the offset component thereof canceled in this way as the tracking-error signal TE, a track can be traced correctly.

There have been proposed a variety of techniques to generate a cancel signal for canceling the offset component. In the case of the circuit provided by this embodiment, a lens shift signal representing the magnitude of a shift of the objective lens from a center point in the tracking direction is used as the cancel signal. The use of such a lens shift signal in the circuit provided by this embodiment as a signal for canceling a lens shift signal is based on the assumption that a shift of a laser spot over the photo detector in the radial direction of the disc 51 is a phenomenon caused by a shift of the objective lens from a center point in the tracking direction.

The generation of the lens shift signal to be used as the cancel signal is also based on detection signals obtained from the photo detectors of the laser coupler 230.

FIG. 10A is a diagram conceptually showing the configuration of a tracking error signal generation circuit provided by the embodiment.

The detection signal A obtained from the detection area A of the photo detector 242 is added by an adder 251a to the detection signal B obtained from the detection area B of the photo detector 242. By the same token, the detection signal C obtained from the detection area C of the photo detector 242 is added by an adder 251b to the detection signal D obtained from the detection area D of the photo detector 242. Then, an adder 252 subtracts a sum (C+D) produced by the adder 251b from a sum (A+B) produced by the adder 251a to generate a push-pull signal PP where PP=(A+B)−(C+D).

As is obvious from the above description, the push-pull signal PP conveys detection information acquired by finding a difference in intensity of received light between 2 detection areas obtained as a result of division of the photo detector 242 by a line passing through a center point in parallel to the tracking direction. The arithmetic calculations described above are thus basic processing for detecting the tracking-error signal TE based on the push-pull technique.

Then, an adder 253 subtracts a lens shift signal LS from the push-pull signal PP. In this way, the tracking-error-signal generating circuit eliminates an offset component super posed on the push-pull signal PP, outputting the tracking-error signal TE. As described earlier, the offset component corresponds to the magnitude of a shift of the objective lens from a center point position.

As shown in FIG. 10B, the tracking-error signal TE generated in this way is a signal that serves typically as a target value in a state of on-track and has a level varying in the positive and negative directions in accordance with the direction of the detrack. In FIG. 10B, the 0 level is used as the target value just for the sake of convenience.

Next, the configuration of a circuit for generating the lens shift signal LS is explained.

On the interlace addressing disc provided by this embodiment, a pit area is created on the innermost circumference of the disc. The pit area is used for recording, among other data, unrewritable TOC information. On the outer side of the pit area, a rewritable magneto optical area is created for recording user data. The magneto optical area is an area having lands and grooves shown in FIG. 2.

In the actual disc drive apparatus provided by this embodiment, there is a difference in configuration for generating the lens shift signal between the pit area and the magneto optical area. In order to make the configuration for generating the lens shift signal easy to explain, however, only the configuration for generating the lens shift signal in the magneto optical area is described.

Speaking about the configuration for generating the lens shift signal in the magneto optical area, there is a difference between the configuration of a circuit for generating the lens shift signal with the tracking servo loop turned on and the configuration of a circuit for generating the lens shift signal in a transition from a state with the tracking servo loop turned off to a state with the tracking servo loop turned on.

Figure 11:
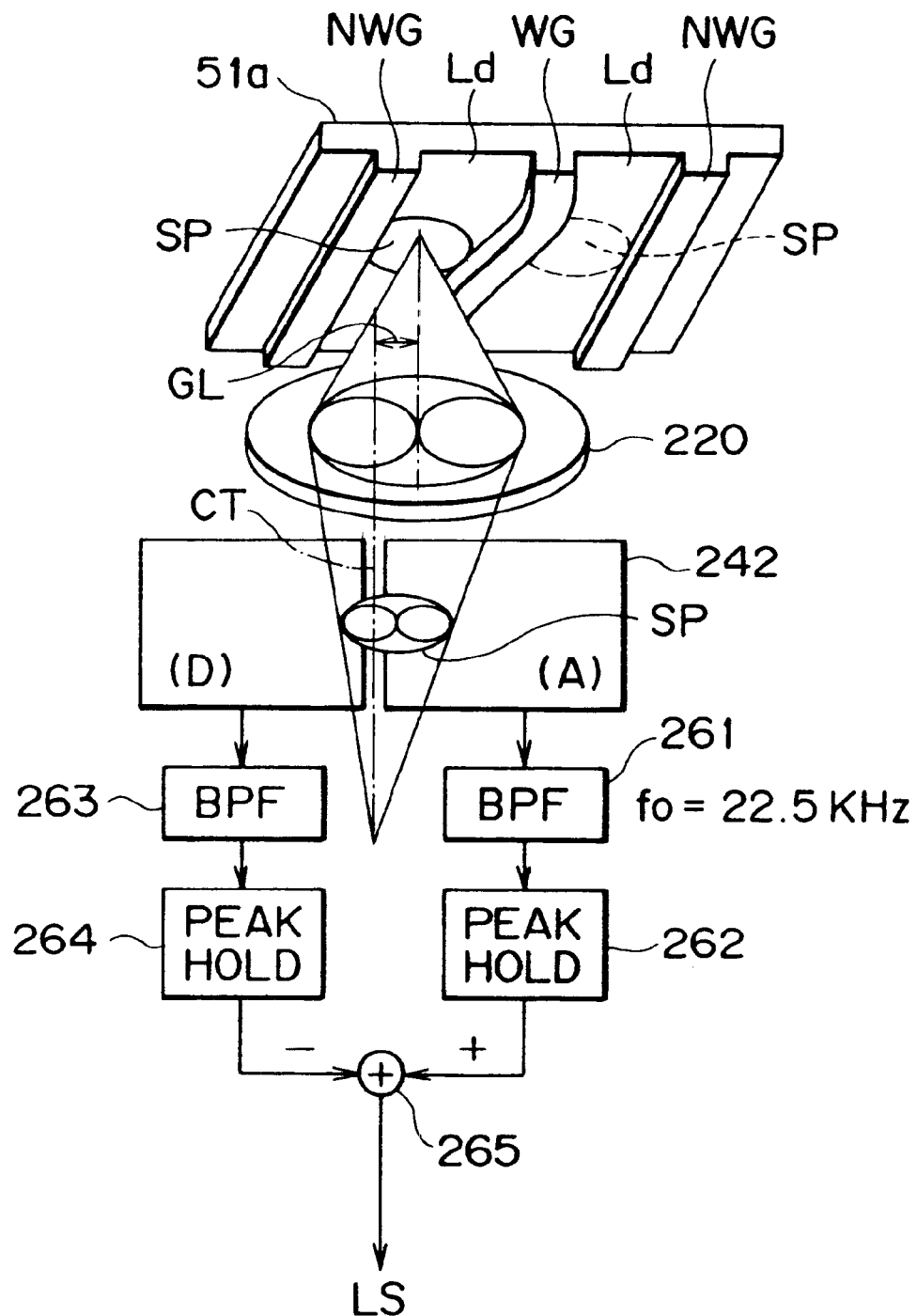
FIG. 11 is a circuit diagram showing the configuration of a Wpp-lens-shift-signal generation circuit provided by the embodiment.

The description begins with an explanation of the configuration of a circuit for generating the lens shift signal to be used under an operating condition with the tracking servo loop turned on with reference to FIG. 11.

With the signal surface 51a of the disc 51 used as the magneto optical area, that is, an area for creating lands Ld, wobbled grooves WG and non-wobbled grooves NWG, and with the tracking servo loop turned on, the lens-shift-signal generation circuit shown in the figure makes use of the fact that the right-left balance of a laser spot obtained at the photo detector 242 changes because of a detrack state while the balance of a component by wobbling does not change because of a detrack state.

In a word, the lens-shift-signal generation circuit has a configuration wherein a difference in balance between the levels of wobbling modulation components obtained from the detection areas A and D on both outer sides of the photo detector 242 is used to generate the lens shift signal LS.

It should be noted that such a lens-shift-signal generation circuit is also referred to as a Wpp (Wobbling Push-Pull)-lens-shift-signal generation circuit.

The Wpp-lens-shift-signal generation circuit comprises band-pass filters (BPF) 261 and 263, peak hold circuits 262 and 264 for the BPFs 261 and 263 respectively and an adder 265. The BPFs 261 and 263 pass on respectively components of detection signals A and D with a wobbling frequency of the detection areas A and D on the photo detector 242. An example of the wobbling frequency is a center frequency of 22.5 KHz.

In this configuration, only modulation components of wobbling of the detection signals A and D generated by the photo detector 242 pass through the BPF 261 and 263 respectively. The peak values of signals output by the BPF 261 and 263 are held by the peak hold circuits 262 and 264 respectively.

The peak hold values output by the peak hold circuits 262 and 264 are supplied to the adder 265.

The adder 265 subtracts the peak hold value output by the peak hold circuit 264 from the peak hold value output by the peak hold circuit 262. A difference obtained as a result of the subtraction done by the adder 265 has a direct-current-component level corresponding to a lens shift magnitude GL relative to the actual center-point position CT. That is to say, the difference is the lens shift signal LS. The lens shift signal LS is supplied to the adder 253 explained earlier by referring to FIG. 10A.

Figure 12:
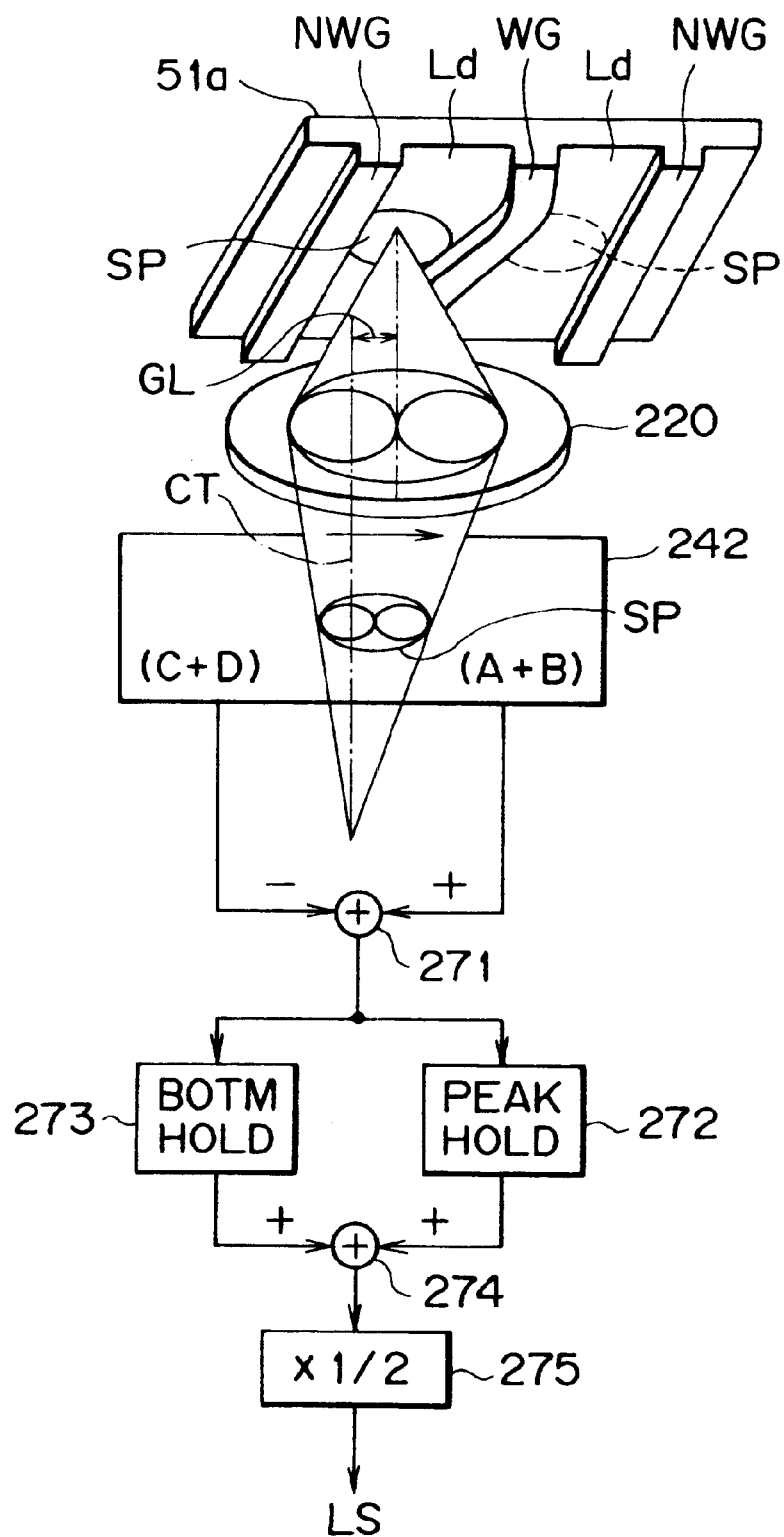
FIG. 12 is a circuit, diagram showing the configuration of a TON-lens-shift-signal generation circuit provided by the embodiment.

The following description explains the configuration of a circuit for generating the lens shift signal in a transition from a state with the tracking servo loop turned off to a state with the tracking servo loop turned on with reference to FIG. 12. It should be noted that components identical with those shown in FIG. 11 are denoted by the same reference numerals as the latter and their explanation is not repeated.

In the lens-shift-signal generation circuit shown in FIG. 12, as detection signals generated by the photo detector 242, the signals represented by (A+B) and (C+D) are obtained.

An adder 271 then subtracts the detection signal (C+D) from the detection signal (A+B) to generate a push-pull signal as follows:

(A+B)−(C+D)

The push-pull signal is split, being supplied to a peak hold circuit 272 and a bottom hold circuit 273. The peak hold circuit 272 detects and holds a peak value of the push-pull signal. On the other hand, the bottom hold circuit 273 detects and holds a bottom value of the push-pull signal.

The peak hold value of the peak hold circuit 272 is added by an adder 274 to the bottom hold value of the bottom hold circuit 273 and a sum obtained as a result of the addition by the adder 274 is supplied to a ½-time processing circuit 275 to be multiplied by ½.

The ½-time processing circuit 275 computes an average of the peak hold value of the peak hold circuit 272 and the bottom hold value of the bottom hold circuit 273. The output of the ½-time processing circuit 275 is used as the lens shift signal LS.

When the tracking servo loop is turned off, for example, control to drive the biaxial mechanism to move the objective lens 220 in the tracking direction is not executed. In this case, the objective lens 220 is held by the biaxial mechanism, being shifted from the center-point position CT by a lens shift GL which may have a value of 0. The shift is caused by a combination of an inclined state of the main body of the disc drive apparatus (that is, the video camera in this case) and a gravity borne at that time. Then, the disc 51 is rotating in this state.

The disc 51 is rotating at no small amount of eccentricity, resulting in a state in which a laser spot SP radiated on the signal surface 51a crosses a number of tracks determined by the degree of eccentricity. A difference in balance between the absolute value of a peak value of the push-pull signal obtained at that time and the absolute value of a bottom value of the signal is proportional to the lens shift magnitude GL of the objective lens 220 relative to the center-point position CT. If the objective lens 220 is positioned at the center-point position CT, the difference in balance between the absolute value of a peak value of the push-pull signal obtained at that time and the absolute value of a bottom value of the signal is 0.

An average of peak and bottom values having such a difference in balance or a difference in level computed by the ½-time processing circuit 275 represents the magnitude of a lens shift with the tracking servo loop turned off. The average is thus the lens shift signal LS.

According to the above description, the Wpp lens-shift-signal generation circuit and the TON lens-shift-signal generation circuit are configured separately. It should be noted, however, that these register-shift-signal generation circuits never operate at the same time so that it is possible to provide a configuration actually including only a register-shift-signal generation circuit block shared by (capable of serving as) the Wpp lens-shift-signal generation circuit and the TON shift-shift-signal generation circuit by in accordance with the state of means such as a switch.

The circuit for generating the playback RF signal in the RF amplifier 101 uses the detection signals produced by the photo detector 243.

In the case of a rewritable area of a magneto optical disc, for example, a detection signal J (J=Jy1+Jx+Jy2) obtained from the photo detector 243b shown in FIG. 7 is subtracted from a detection signal I (I=Iy1+Ix+Iy2) obtained from the photo detector 243a also shown in FIG. 7 to produce a playback RF signal (I−J).

Among discs used in this embodiment, there is a playback-only disc with the entire area of the signal surface thereof actually created as a pit area. In addition, on the innermost circumference of the magneto optical disc, a pit area is created for recording unrewritable control information. In the case of detection for such a pit area, a detection signal J obtained from the photo detector 243b is added to a detection signal I obtained from the photo detector 243a to produce a playback RF signal (I+J).

6. Access Operations

6-1 Overview of the Operations

The following description explains an access to an interlace addressing disc as an operation carried out by the disc drive apparatus implemented by the embodiment with a configuration described above.

Before describing an access operation carried out by the disc drive apparatus implemented by the embodiment, the following description explains differences in operation between a positive operating polarity and an opposite operating polarity of the tracking-servo control circuit.

FIGS. 13A, 13B and 13C are diagrams showing the operating concept of a state of on-track along a land LD as an operation of the tracking-servo control circuit.

In the case of the configuration of the optical pickup and the structure of the disc used in this embodiment, in a relation between the land Ld and the tracking-error signal TE, a state in which a target value of a 0 level is obtained at a position corresponding to a 180-degree phase of the tracking-error signal TE as shown in FIGS. 13A and 13B is referred to as a state of on-track along the land Ld.

When the laser spot SP is shifted from the land Ld toward an inner circumference of the disc, the tracking-error signal TE increases in a plus direction relative to the 0-level target value. When the laser spot SP is shifted from the land Ld toward an outer circumference of the disc, on the other hand, the tracking-error signal TE increases in a minus direction relative to the 0-level target value.

In order to attain a state of on-track along the land Ld, as an operation of the tracking-servo control circuit, control is executed to converge the tracking-error signal TE to the 0-level target value as follows. If the tracking-error signal TE increases in a plus direction relative to the 0-level target value, the objective lens 220 is driven in a direction toward an outer circumference. If the tracking-error signal TE increases in a minus direction relative to the 0-level target value, on the other hand, the objective lens 220 is driven in a direction toward an inner circumference.

In the case of this embodiment, a land Ld is used as a recording track. Thus, the tracking-servo control operation with respect to the phase of the tracking-error signal TE is an operation carried out at normal times. In the following description, an operating polarity of the tracking-servo control circuit corresponding to control toward a state of on-track along the land Ld is referred to as a positive polarity.

Under a condition of the tracking-servo control circuit set at a positive operating polarity as described above, let a laser spot SP be in a state of on-track along the track Tr•A as shown in FIG. 13A. A state of on-track along the track Tr•A is a state in which the tracking-servo control causes the track Tr•A to be traced correctly. Assume that the tracking-servo control is executed to drive the objective lens 220 from the present position by a distance of about 1 track in a direction toward an outer circumference. As a result of the control execution, the laser spot SP is put in a state of on-track along the track Tr•B as shown in the figure. That is to say, the so-called jump of 1 track is made.

It should be noted that a jump of 1 track is an operation to jump the laser spot in the radial direction of the disc to an adjacent land used as a track provided that a land is used as a track as described above. If a groove is used as a track, on the other hand, a jump of 1 track is an operation to jump the laser spot from the current groove to an adjacent groove used as a track.

The pull-in signal PI described earlier is information indicating a total intensity of lights reflected by the disc. The level of the pull-in signal PI is shown in FIG. 13C. When a laser beam is radiated, putting the laser spot SP in a state of on-track along a land, the pull-in signal PI reaches a maximum. When a laser beam is radiated, putting the laser spot SP in a state of on-track along a groove, on the other hand, the pull-in signal PI reaches a minimum. This phenomenon of the pull-in signal PI is also observed as well in the negative operating polarity of the tracking-servo control circuit to be described next as shown in FIG. 13F.

On the other hand, in a relation between a groove and the tracking-error signal TE, a state in which a target value of a 0 level is obtained at a position corresponding to a 0-degree or 360-degree phase of the tracking-error signal TE as shown in FIGS. 13D and 13E is referred to as a state of on-track along the groove. In this case, the groove can be a wobbled groove WG or a non-wobbled groove NWG.

That is to say, in a relation between a land and the tracking-error signal TE, the operating polarity of the tracking-servo control circuit corresponding to control toward a state of on-track along a groove is referred to as an opposite polarity.

When the laser spot SP is shifted from a groove toward an inner circumference of the disc, the tracking-error signal TE increases in a minus direction relative to the 0-level target value. When the laser spot SP is shifted from a groove toward an outer circumference of the disc, on the other hand, the tracking-error signal TE increases in a plus direction relative to the 0-level target value.

In order to attain a state of on-track along a groove, as an operation of the tracking-servo control circuit, control is executed to converge the tracking-error signal TE to the 0-level target value as follows. If the tracking-error signal TE increases in a minus direction relative to the 0-level target value, the objective lens 220 is driven in a direction toward an outer circumference. If the tracking-error signal TE increases in a plus direction relative to the 0-level target value, on the other hand, the objective lens 220 is driven in a direction toward an inner circumference.

It should be noted that, in the following description, an operating polarity of the tracking-servo control circuit corresponding to control toward a state of on-track along a land Ld is referred to as a positive polarity while an operating polarity of the tracking-servo control circuit corresponding to control toward a state of on-track along a groove is referred to as an opposite polarity.

Under a condition of the tracking-servo control circuit set at an opposite operating polarity as described above, let a laser spot SP be in a state of on-track along a specific non-wobbled groove NWG as shown in FIG. 13D. If control is executed by the tracking-servo control circuit to make a jump of 1 track from the current state to an outer circumference, as a result of the control execution, the laser spot SP is put in a state of on-track along a wobbled groove WG adjacent to the specific non-wobbled NWG as shown in the figure.

Next, an access operation of this embodiment is described by considering the difference in tracking operation caused by the difference in operating polarity of the tracking-servo control circuit.

Assume that, with the operating polarity of the tracking-servo control circuit fixed at the positive polarity, processing is carried out to make an access from a present land track to a target land track physically separated from the present land track in the radial direction of the disc. Here, a land track is a land used as a track.

In this case, the target track of the laser spot SP is a track Tr•A or Tr•B. During a search in the access operation, an address recorded as a wobbled groove WG common to the tracks Tr•A and Tr•B is decoded without regard to whether the target track is a track Tr•A or Tr•B. Thus, the code of an address on the disc can be recognized.

If data has been recorded on the track Tr•A or Tr•B, the header of the recorded data should include an identification indicating whether the track for recording the data is a track Tr•A or Tr•B. Thus, the track currently being traced can be identified from the identification.

If no data has been recorded in the recording area on a track Tr•A or Tr•B found in the search, on the other hand, header information can not be acquired. As a result, it is impossible to form a judgment as to whether a track Tr•A or Tr•B is being traced currently as a target track.

The above problem is caused by the following. In the configuration of the laser coupler and the RF-signal processing system provided by the embodiment according to the 1-beam system (that is, the push-pull system), extraction of a modulation component of wobbling from information conveyed by beams reflected by the photo detectors itself is possible. Here, by a modulation component of wobbling, a component modulated by address information is meant. However, the wobbling-modulated information does not vary in dependence on whether the wobbling is on an outer or inner circumference of the land track.

That is to say, from information conveyed by beams reflected by the photo detectors, it is impossible to obtain information indicating whether the wobbling is on an outer or inner circumference of the land track.

As described above, in an operation to record or play back data into or from an interlace-addressing disc in a disc drive apparatus implemented by this embodiment, by merely relying on information conveyed by beams reflected by the photo detectors, it is impossible to form a judgment as to whether the track currently being traced is Tr•A or Tr•B in some cases.

In order to solve the above problem, in the case of this embodiment, an operation is carried out as described below to correctly make an access to either a track Tr•A or a track Tr•B as a target track. It should be noted that, in the following description, FIG. 14 is referred to along with FIGS. 13A to 13F which were referenced before.

Assume that, with a specific track (namely, a track Tr•A or Tr•B) being traced in the disc drive apparatus implemented by the embodiment, a request for an access to a target track is made by specifying an address and specifying whether the target track is a track Tr•A or Tr•B.

Also assume that, before the request for an access is made, the laser spot SP shown in FIG. 13A as a solid-line ellipse is tracing a land used as a track Tr•A. That is to say, the operating polarity of the tracking-servo control circuit is the positive polarity at that time. In addition, assume that no data is recorded on the track Tr•A so that the track currently being traced can not be identified.

When the request for an access is received under the conditions described above, for example, the tracking-servo control circuit is switched to an operation corresponding to the opposite polarity. As a result, the laser spot SP is driven to a state of on-track along an adjacent non-wobbled groove NWG or an adjacent wobbled groove WG on a side of the land used as the track Tr•A traced so far.

The state of on-track is shown in FIG. 13A as a state of on-track of a solid-line laser spot SP relative to an adjacent non-wobbled groove NWG on the inner circumference, or a state of on-track of a dashed-line laser spot SP relative to an adjacent wobbled groove WG on the outer circumference of the track Tr•A.

That is to say, when the request for an access is received in this embodiment, first of all, control is executed to put the laser spot SP from the land to a state of on-track along a groove adjacent to the land.

In a state of on-track established along a non-wobbled groove NWG as is the case with the laser spot SP shown as a solid-line ellipse in FIG. 13D, for example, information on the address of the present position can not be obtained. The address of the present is information required in the computation of the amount of movement to a search destination in search control to be executed from now on.

With the laser spot SP currently put in a state of on-track along a non-wobbled groove NWG, control is executed to make a jump of 1 track in a direction toward an outer or inner circumference. Grooves adjacent to the present non-wobbled groove NWG on both sides thereof are wobbled grooves WG. Thus, the jump of 1 track puts the laser spot SP in a state of on-track along a wobbled groove WG.

Assume the case shown in FIG. 13D as an example. For instance, let the jump of 1 track to an outer circumference be requested with the solid-line laser spot SP put in a state of on-track along a non-wobbled groove NWG as shown in FIG. 13D. On such a request, the laser spot SP shown as a dashed-line ellipse is moved in a state transition to a wobbled groove WG adjacent to the non-wobbled groove NWG on the outer-circumference side thereof.

In this way, the laser spot SP can be put in a state of on-track along a wobbled groove and an address can be acquired. In addition, access control can also be executed thereafter.

It should be noted that, if data has been recorded on the land track being traced at the time a request for an access is made, it is possible to form a judgment as to whether the track being traced is a track Tr•A or Tr•B on the basis of a track identification included in the data recorded on the track. From a positional relation among tracks, a wobbled groove WG is known to be always positioned on the outer-circumferential side of a track Tr•A or on the inner-circumferential side of a track Tr•B.

Thus, in a case like the one described above where it is possible to form a judgment as to whether the current land track is a track Tr•A or Tr•B, the laser spot SP is forcibly moved in the direction toward a wobbled groove WG adjacent to the current land track. In actuality, the objective lens 220 is forcibly moved in the tracking direction. Then, the tracking servo is set in the opposite operating polarity with predetermined timing. In this way, the laser spot SP can certainly be moved or track-jumped from the current land track to the wobbled groove WG in one action.

It should be noted that, in an operation to move a laser spot SP from a land to a groove adjacent to the land in the way described above or in a reverse movement from a groove to a land adjacent to the groove as will be described later, a controlled movement to a state of on-track accomplished by determination of the movement direction is referred to hereafter as a jump of 0.5 tracks.

The jump of 1 track described earlier is an operation to move from a land (or a groove) to another land (or a groove) adjacent thereto. On the other hand, the jump of 0.5 tracks is an operation to move by a distance just equal to ½ the distance of the jump of 1 track.

Since the operation of the tracking-servo control circuit to make a jump of 0.5 tracks will be explained later in a description of an operation to make a jump of 0.5 tracks from a groove to a groove adjacent thereto, it is not necessary to explain the operation now.

By carrying out the operation explained so far, the laser spot SP moves from a land track to a wobbled groove WG, entering a state of on-track along the groove WG.

In this state of on-track, sled move control (that is, control of a movement of a sled mechanism) is properly executed in conjunction with track jump control to move the laser spot or the objective lens 220 by a distance to a target address. The distance is calculated from the address on the wobbled groove WG of the current state of on-track and the address at the destination of the access. The movement of the laser spot SP or the objective lens 220 is referred to as a search operation.

It should be noted that an actual search operation begins with a coarse search to move the laser spot by a relatively long distance to a position in close proximity to the target address. Then, a track jump over several tracks is made. Finally, a search is carried out as fine adjustment. In this way, an access to a track including the target address is made eventually. During the execution of the search operation described above, the tracking-servo control circuit sustains the opposite operating polarity.

Thus, in the course of a search operation, the laser spot SP is put in a state of on-track along a groove several times. when the laser spot arrives at a non-wobbled groove NWG in a state of on-track, a jump of 1 track explained earlier is made to execute control of a movement to a state of on-track along a wobbled groove WG located at circumference adjacent to the non-wobbled groove NWG. Then, from this state, a next sled move or a track jump is started.

At a stage where the movement gets settled after the search operation described above, the laser spot SP enters a state of on-track along a wobbled groove WG having the address of the access target.

An actual typical state corresponding to what is described above is shown in FIG. 14A.

In FIG. 14A, a laser spot SP-1 shown as a solid-line ellipse is in a state of on-track along a wobbled groove WG having the address of the access target described earlier.

Later on, from the state of on-track along the wobbled groove WG, the laser spot SP-1 makes a jump of 0.5 tracks to a track Tr•A or Tr•B serving as the target of the access to complete the access operation.

In the track structure, a wobbled groove WG and adjacent land tracks on both sides of the groove WG are related to reach other in such an arrangement that a track Tr•A and a track Tr•B are placed on the inner-circumferential side and the outer-circumferential side of the groove WG respectively.

Thus, with the laser spot SP-1 put in a state of on-track along a wobbled groove WG having the address of an access target as described above, an adjacent track on either side of the groove WG can of course be judged to be a track Tr•A or a track Tr•B.

Then, the laser spot can be jumped by 0.5 tracks from this state to a target and track. To be more specific, if the target land track is a track Tr•A, a jump of 0.5 tracks is made to the inner-circumferential side. If the target land track is a track Tr•B, on the other hand, a jump of 0.5 tracks is made to the outer-circumferential side.

The following description explains a typical operation of a jump of 0.5 tracks with a land track Tr•A used as the target of an access under a condition shown in FIG. 14A.

If the target land track is a track Tr•A, the laser spot SP-1 or the objective lens 220 is moved in a jump of 0.5 tracks to the inner-circumferential side. Thus, in this embodiment, a bias corresponding to the inner-circumferential side is provided to the target value of the tracking-error signal TE as shown in FIG. 14B. It should be noted that the absolute value of the bias can be varied so as to raise it gradually.

With such a bias, the tracking-servo control circuit moves the objective lens 220 in the direction toward an inner circumference so as to converge the tracking-error signal to the biased target value.

When the objective lens 220 moves in the direction toward an inner circumference, the laser spot SP1 moves, turning into a laser spot SP2 in a state transition as shown in FIG. 14A where the laser spot is approaching a land used as a track Tr•A. In other words, with the wobbled groove WG taken as a reference, the laser spot can be seen to move from the wobbled groove WG in the direction toward an inner circumference, entering a detrack state.

Thus, the level of the pull-in signal PI gradually increases with the amount of detrack as is obvious from relations shown in FIGS. 14A. and 14C.

Here, in the case of this embodiment, as shown in FIG. 14C, a predetermined threshold value this set for the pull-in signal PI which varies as described above. The determination of the threshold value th is based on the level of the pull-in signal PI corresponding to the position of the objective lens which typically establishes a state of on-track along a target land track properly when the operating polarity of the tracking-servo control circuit is switched from the opposite polarity to the positive polarity as described below.

Then, as the detracking process continues from the state of the laser spot SP-2 shown in FIG. 14A to a detrack state of a laser spot SP-3 shown as a dashed-line ellipse in FIG. 14D, the pull-in signal PI exceeds the threshold value th as shown in FIG. 14F.

Thus, in order to set a state of on-track along a groove, the operating polarity of the tracking-servo control circuit was set at an opposite polarity so far. Then, the operating polarity of the tracking-servo control circuit is switched from the opposite polarity to the positive polarity with timing of the pull-in signal PI's exceeding the threshold value th.

As a result, the tracking-servo control circuit switches its operation to establish a state of on-track along a land track. In such a state of on-track, control is executed to let a laser-spot SP-4 shown as a solid-line ellipse in FIG. 14D trace a track Tr•A as a track at the destination of the access. When this state of on-track along the track Tr•A is established, the access operation of this embodiment is completed.

6-2 Configuration of the Tracking-Servo Control Circuit

The following description explains a typical configuration for implementing an access operation of the embodiment described above. The description begins with an explanation of a configuration of the tracking-servo control circuit for making the access operation possible.

Figure 15:
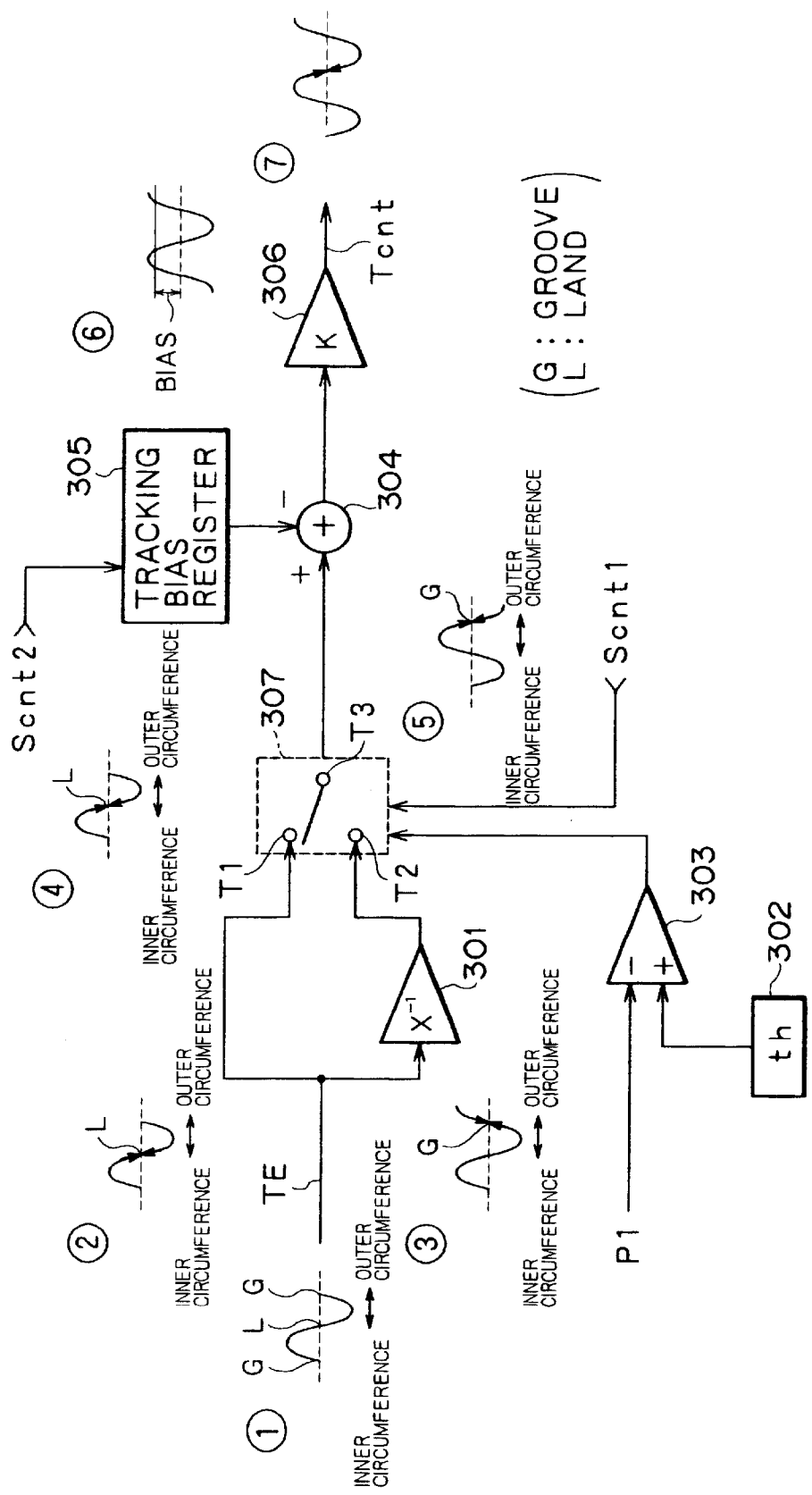
FIG. 15 is an explanatory diagram showing a typical configuration of a tracking-servo control circuit provided by the embodiment.

FIG. 15 is a diagram showing a typical configuration of the tracking-servo control circuit used in this embodiment. Typically provided in the servo processor 112, the other hand control circuit has a configuration allowing the operating polarity thereof to be switched so as to switch the control from the control to establish a state of on-track along a land to the control to establish a state-of on-track along a groove or vice versa as described earlier.

The tracking-servo control circuit inputs the tracking-error signal TE generated by the matrix amplifier 107 and the pull-in signal PI.

First of all, the tracking-error signal TE (shown as waveform ①) supplied to the tracking-servo control circuit has phases different from each other by 180 degrees in dependence on whether the state of on-track is established along a land or a groove as has been described earlier by referring to FIGS. 13A to 13F. To be more specific, in the case of a state of on-track along a land, the tracking-error signal TE is represented by waveform ②. In the case of a groove state of on-track along a groove, on the other hand, the tracking-error signal TE is represented by waveform ③.

The tracking-error signal TE is split into 2 signals supplied to 2 systems respectively. To put it in detail, one of the split tracking-error signals TE is supplied directly to a terminal T1 of a switch 307. The other split tracking-error signal TE is supplied to a terminal T2 of the switch 307 by way of a phase inverter 301 for inverting the phase of the tracking-error signal TE.

In addition to the terminals T1 and T2, the switch 307 also has a terminal T3 which can be connected selectively to the terminal T1 or T2 in dependence on a control signal Scnt1 generated typically in accordance with a command issued by the driver controller 46 or a signal output by a comparator 303.

With regard to the operation of the switch 307 according to the signal output by the comparator 303, the terminal T3 is connected to the terminal T1 or T2 when the signal output by the comparator 303 is set at an H (high) or L (low) level respectively.

In the control of a jump of 0.5 tracks explained earlier by referring to FIGS. 14A to 14F, the comparator 303 compares the level of the pull-in signal P1 with the threshold value th, switching the terminal connection of the switch 307 in accordance with the result of the comparison.

To put it in detail, the pull-in signal PI is supplied to an inverting pin of the comparator 303 while the threshold value th stored in a threshold-value register 302 is supplied to a non-inverting pin of the comparator 303. Thus, when the level of the pull-in signal PI is found higher than the threshold value th, the signal output by the comparator 303 is set at the H level. When the level of the pull-in signal PI is found lower than the threshold value th, on the other hand, the signal output by the comparator 303 is set at the L level.

It should be noted that it is also possible to provide a configuration in which the function of the comparator 303 to control the switch 307 is executed by the driver controller 46. To put it in detail, the driver controller 46 acquires data representing the pull-in signal PI in this configuration. Then, the data is compared with the threshold value th set internally in advance and the control to actuate the switch 307 is executed in accordance with. the result of the comparison.

When the terminal T1 of the switch 307 is connected to the terminal T3, a tracking-error signal TE with the polarity thereof uninverted is output from the terminal T3. In this case, the tracking-servo control circuit with a positive operating polarity is connected.

When the terminal T2 of the switch 307 is connected to the terminal T3, on the other hand, a tracking-error signal TE with the polarity thereof inverted is output from the terminal T3. In this case, the tracking-servo control circuit with an opposite operating polarity is connected.

As a result, the tracking-error signal TE output from the terminal T3 of the switch 307 has a consistent phase as shown by waveforms ④ and ⑤ in spite of the fact that the polarity of the tracking-error signal TE generated by a land is the inverted polarity of the tracking-error signal TE generated by a groove as shown in FIGS. 13A to 13F.

The uniform polarity of the tracking-error signal TE is intended to provide a uniform control polarity for a land and a groove in the control circuit for driving the objective lens 220 at a later stage.

The tracking-error signal TE output from the terminal T3 of the switch 307 is supplied to an adder 304.

The adder 304 adds a bias set in a tracking bias register 305 to the tracking-error signal TE output from the terminal T3 of the switch 307, outputting the sum to an amplifier 306. It should be noted that the bias set in the tracking bias register 305 can be changed typically by a control signal Scnt2 output by the driver controller 46.

By changing the bias, a target value for the tracking-error signal TE can be shifted as shown by waveform ⑥ in the figure. By execution of tracking-servo control based on the tracking-error signal TE with a bias added thereto as described above, the objective lens 220 is forcibly moved from a position on a land or a groove in a direction toward an inner of outer circumference on the disc 51 in accordance with the value of the bias.

The amplifier 306 adjusts the gain of the signal output by the adder 304, generating a tracking control signal Tcnt shown as waveform ⑦ in the figure to the servo driver 113 show n in FIG. 5.

6-3 Processing Operations

Figure 16:
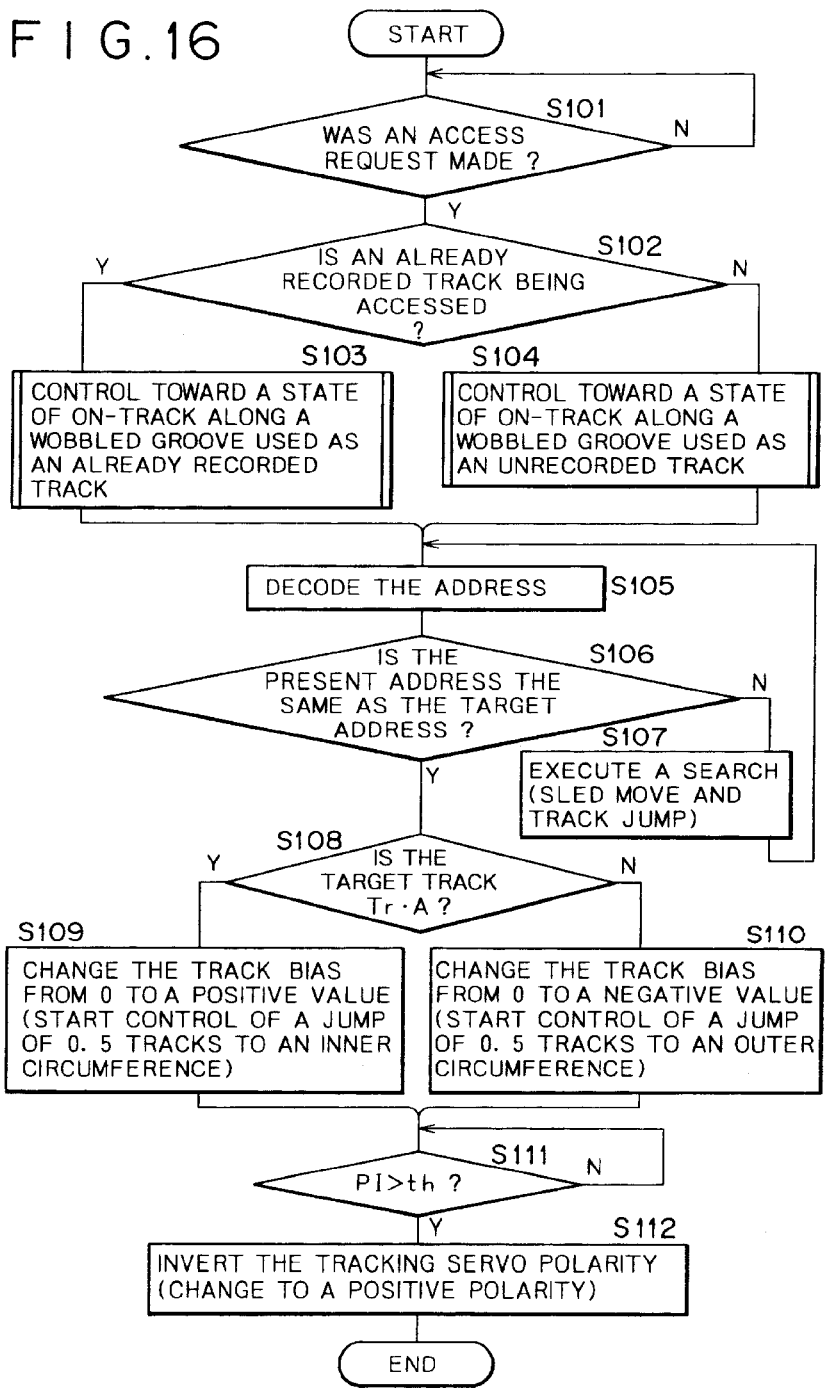
FIG. 16 shows a flow chart representing processing operations to implement an access in the embodiment.
Figure 17:
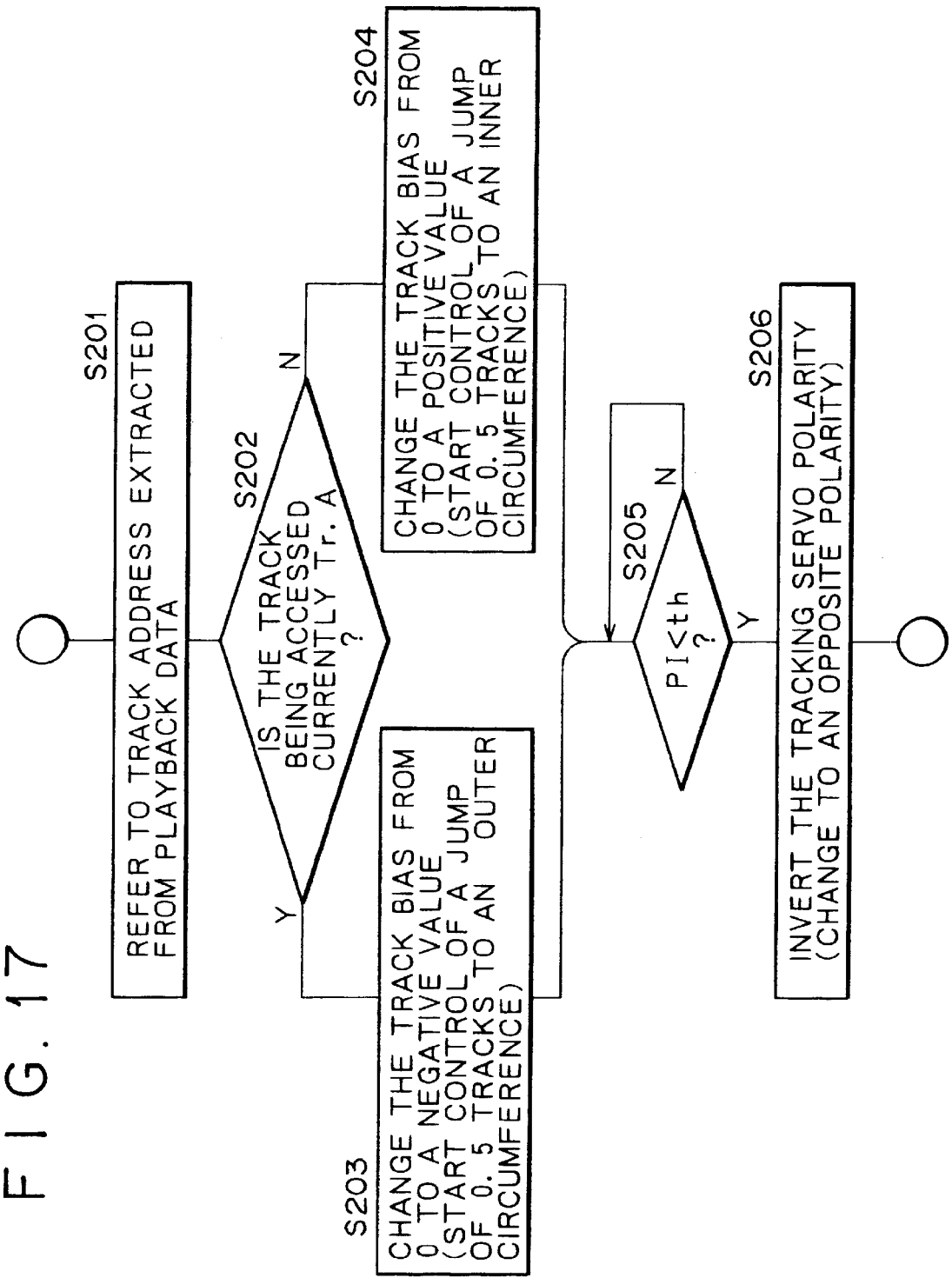
FIG. 17 shows a flowchart representing processing operations carried out as control to establish a state of on-track along a wobbled groove in an already recorded area in an access operation.
Figure 18:
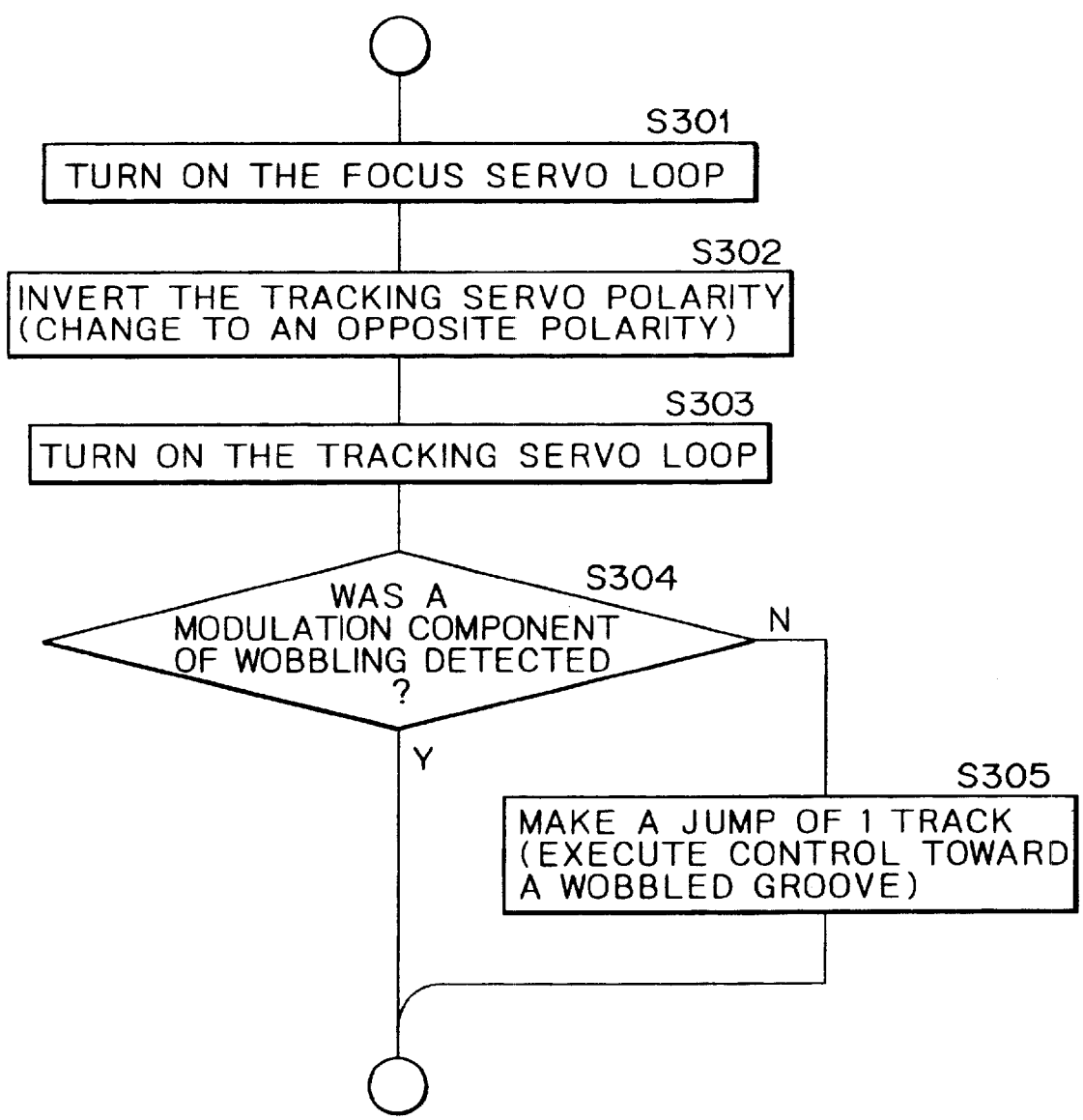
FIG. 18 shows a flowchart representing processing operations carried out as control to establish a state of on-track along a wobbled groove in an unrecorded area in an access operation.

The following description explains processing operations carried out by typically the driver controller 46 in order to implement an access operation of this embodiment by referring to flowcharts shown in FIGS. 16 to 18. The operation of the tracking-servo control circuit shown in FIG. 15 is controlled in accordance with the processing operations carried out by the driver controller 46. It should be noted that, in the following description, the control function of the switch 307 based on the result of comparison output by the comparator 303 is included in the driver controller 46.

As shown in FIG. 16, a routine representing access processing begins with a step S101 at which the driver controller 46 waits for a request for an access.

In the case of this embodiment, for example, a request for an access is made when an operation specifying a search playback, is carried out on the operation unit 7 shown in FIG. 4. In a recording or playback operation, a request for an access is also made when it is necessary to make the access to a recording area physically separated from the present position on the disc 51.

A request for an access includes track specification information specifying the address of the access target and specifying either a track Tr•A or a track Tr•B.

When a request for an access is recognized at the step S101, the flow of the routine goes on to a step S102.

At the step S102, the driver controller 46 forms a judgment as to whether or not an access is being made to a track for recording data. In this case, the track is a land track. That is to say, the driver controller 46 forms a judgment as to whether or not, in the present state, an operation is carried out to play back data from a land track serving as a recording area. The judgment can be formed by the driver controller 46 by recognition of the present operating state of the playback-signal processing circuit.

If the result of the judgment formed at the step S102 is an acknowledgment, the flow of the routine goes on to a step S103. if the result of the judgment formed at the step S102 is a negation, however, the flow of the routine goes on to a step S104.

At the step S103, control processing is carried out to put the laser spot SP or the objective lens 220 in a state of on-track along a wobbled groove WG adjacent to an already recorded land track currently being traced.

A negation outcome of the judgment formed at the step S102 is obtained when, for example, a request for an access has been made upon a start of an operation to record data on the disc or there has been a request for an access to record following data starting from an address on the disc physically separated from a land track subjected to the operation to record the preceding data so far. In this case, the flow of the routine goes on to a step S104.

When the flow of the routine goes on to the step S104, it is quite within the bounds of possibility that the land track corresponding to the current position of the objective lens 220 is located in an unrecorded area. For this reason, at the step S104, control processing is carried out to establish a state of on-track along a wobbled groove WG adjacent to an unrecorded track.

The processing carried out at the step S103 is represented by a flowchart shown in FIG. 17.

The following description excludes a detailed explanation of formats or the like. As described earlier, data to be recorded includes a header for each predetermined data unit. The header includes a track address also indicating whether the present track is a track Tr•A or Tr•B.

The processing represented by the flowchart shown in FIG. 17 begins with a step S201 to carry out processing to extract the track address from data played back from a land track currently being traced by the laser spot SP or the objective lens 220 and examine the substance of the track address.

The flow of the processing then goes on to a step S202 at which the driver controller 46 forms a judgment as to whether or not the present track is a track Tr•A. The formation of the judgment is based on the substance of the information on the track address. If the outcome of the judgment is an acknowledgment, the flow of the processing goes on to a step S203. If the outcome of the judgment is a negation, that is, if the present track is a track Tr•B, on the other hand, the flow of the processing goes on to a step S204.

At the previous and present stages, there exists a state wherein a bias value is set in the tracking bias register 305 shown in FIG. 15 as the value of a bias properly establishing a state of on-track along a land track. In this example, a bias value of 0 is used for the sake of convenience.

At the step S203, processing is carried out by the driver controller 46 to gradually decrement the bias value of 0 set in the tracking bias register 305 in the minus direction with the lapse of time.

In accordance with the previous explanation based on FIGS. 13A to 13F, the laser spot SP originated from the objective lens 220 thus starts to move from the present track Tr•A to a wobbled groove WG at a position adjacent to the outer-side circumference of the present track. That is to say, control of a jump of 0.5 tracks in the direction toward the outer side is started.

At the step S204, on the other hand, processing is carried out by the driver controller 46 to gradually increment the bias value of 0 set in the tracking bias register 305 in the plus direction.

The laser spot SP originated from the objective lens 220 thus starts to move from the present track Tr•B to a wobbled groove WG at a position adjacent to the inner-side circumference of the present track. That is to say, control of a jump of 0.5 tracks in the direction toward the inner side is started.

It should be noted that the pieces of processing carried out at the steps S263 and S204 are each processing to make a jump of 0.5 tracks in the directions toward the outer or inner circumference like the pieces processing carried out respectively at the steps S110 and S109 of the flowchart shown in FIG. 16 to be described later.

The flow of the processing then goes on from the step S203 or S204 to a step S205.

At the step S205, the driver controller 146 compares the level of the pull-in signal PI with the threshold value th shown in FIG. 14C and 14E. In this case, the level of the pull-in signal PI has changed to accompany the movement of the laser spot SP in a direction toward an inner or outer circumference respectively. The comparison at the step S205 is carried out repeatedly till the level of the pull-in signal PI exceeds the threshold value th. That is to say, the comparison is carried out by the driver controller 46 in place of the operation of the comparator 303 shown in FIG. 15. As the outcome of the comparison by the driver controller 46 indicates that the level of the pull-in signal PI exceeds the threshold value th, the flow of the processing goes on to a step S206.

In the processing described so far, the operating polarity of the tracking-servo control circuit is set at a positive polarity to carry out an operation to settle the laser spot SP on a land track to be traced.

Then, at the step S206, processing is carried out by the driver controller 46 to invert the operating polarity of the tracking-servo control circuit to an opposite polarity. That is to say, the terminal connection of the switch 307 shown in FIG. 15 is changed over from a connection of the terminals T1 and T3 to a connection of the terminals T2 and T3.

By carrying out the processing at the step S206 as described above, the laser spot SP is put in a state of on-track along a wobbled groove WG. Subsequently, the flow of the processing goes on to a step S105 of the flowchart shown in FIG. 16.

On the other hand, FIG. 18 shows a flowchart representing the control toward a state of on-track along a wobbled groove WG used as an unrecorded track executed at the step S104.

The processing shown in FIG. 18 begins with a step S301 at which the driver controller 46 pulls in the focus servo to execute control to turn on the servo loop. That is to say, in the present state of on-track along an unrecorded land track, control is executed so as to carry out a closed-loop focus servo. By doing so, the focused state of the objective lens 220 on the signal surface of the disc 51 is sustained.

With the objective lens 220 put in a just-focus state as described above, the flow of the processing goes on to the next step S302 at which the operating polarity of the tracking-servo control circuit is inverted to an opposite polarity. That is to say, the terminal connection of the switch 307 shown in FIG. 15 is changed over from a connection of the terminals T1 and T3 to a connection of the terminals T2 and T3. As a result, the tracking-servo control circuit enters an operating mode to converge the laser spot SP to a state of on-track along a groove.

Then, at the next step S303, the driver controller 46 turns on the tracking servo loop. With the tracking servo turned on, the tracking-servo control circuit carries out an operation to put the laser spot SP or the objective lens 220 in a state tracing a groove used as a track. As a result, the laser spot SP or the objective lens 220 is put in a state of on-track along a groove closest to the position to which the laser spot SP has been radiated so far. It should be noted that, at previous and present stages, the laser spot SP or the objective lens 220 can be put in a state of on-track along a wobbled groove WG or a non-wobbled groove NWG.

At this stage, the just-focus state is sustained and a state of on-track along a groove is obtained by the focus-servo control. Thus, a reflected beam received by the photo detector at that time has a resolution with as large a magnitude as modulated by a component corresponding to the wobbling of the groove. That is to say, if the laser spot SP or the objective lens 220 is put in a state of on-track along a wobbled groove WG at that time, the ADIP band-pass filter 108 is capable of extracting a wobble-modulated component from a detection output generated by the photo detector.

The flow of the processing then goes on to a step S304 at which the driver controller 46 forms a judgment on a state of detection by the ADIP band-pass filter 108 typically by forming a judgment as to whether or not a wobble-modulated component has been detected and fetched by the ADIP decoder 110.

If the outcome of the judgment formed at the step S304 is an acknowledgment indicating that the present state is an on-track state of the laser spot SP or the objective lens 220 along a wobbled groove WG, the flow of the processing exits from this routine without doing anything, going on to the step S105 of the flowchart shown in FIG. 16. If the outcome of the judgment formed at the step S304 is a negation indicating that the present state is an on-track state of the laser spot SP or the objective lens 220 along a non-wobbled groove NWG, on the other hand, the flow of the processing proceeds to a step S305 at which the driver controller 46 carries out processing before going on to the step S105 of the flowchart shown in FIG. 16.

At the step S305, control is executed by the driver controller 46 to make a jump of 1 track.

In order to make a jump of 1 track, typically, a tracking control signal is generated by the driver controller 46 to drive the biaxial mechanism so as to force the objective lens 220 to jump by 1 track in the radial direction of the disc 51. Then, while the objective lens 220 is moving in the radial direction of the disc 51, the tracking-error signal TE obtained at that time is monitored by the driver controller 46. If a waveform corresponding to an on-track state of the laser spot SP or the objective lens 220 along an adjacent track which is a groove in this case is observed, the operation to output the tracking control signal for the track jump is discontinued and the normal tracking-servo control is executed.

In this way, the jump of 1 track is made by the laser spot SP or the objective lens 220 from a non-wobbled groove NWG traced so far to an adjacent wobbled groove WG along which a state of on-track is newly established.

It should be noted that, in the control executed at the step S305 to make a jump of 1 track, it is possible to arbitrarily set the motion of the objective lens 220 in a direction toward a wobbled groove WG on an inner or outer circumference.

The explanation is continued by referring back to the flowchart shown FIG. 16.

At a stage after the execution of the processing at the step S103 or S104, an address can be obtained since the laser spot SP has been put in a state of on-track along the wobbled groove WG.

Thus, at a step S105, the ADIP decoder 110 is requested by the driver controller 46 to decode the obtained address. As a result, the driver controller 46 is put in a state of being capable of acquiring the present address.

Then, the flow of the processing goes on to the next step S106 at which the driver controller 46 forms a judgment as to whether the present address acquired from the ADIP decoder 110 is the same as a target address of an access obtained as an address request received earlier.

If the outcome of the judgment is a negation, the flow of the processing goes on to a step S107 at which the driver controller 46 carries out an operation to search for a next address matching the target address. Then, the flow of the processing goes back to the step S105 at which the driver controller 46 repeats the operations to decode an address, to compare the decoded present address with the target address and to search for a next address. These operations are carried out repeatedly till an acknowledgment outcome of the judgment is obtained at the step S106.

The processing of the step S107 is actually carried out typically by the driver controller 46 by computation of a physical movement distance from a difference between the present address and the target address. If the movement distance is equal to or longer than a predetermined value, the sled mechanism is controlled by the driver controller 46 to move the optical head 53 itself in the radial direction of the disc 51 in a coarse search (sled move). Such a coarse search operation can be carried out several times in dependence on a coarse movement distance or can be carried out only once. In addition, for a short distance of the movement, it may not be necessary to carry out such a coarse search operation.

Then, at a stage after the driver controller 46 carries out the coarse search operations described above, the distance of the movement is converged to a level lower than a predetermined value. At this stage, track jump control is executed by moving the objective lens 220 in the radial direction of the disc 51 over a predetermined number of tracks. In this track jump control, the number of tracks is determined typically in dependence on the distance of the movement.

In addition, since the operating polarity of the tracking-servo control circuit is the opposite polarity during the processing carried out at the step S107, the laser spot SP is put in a state of on-track always along a groove after the sled move and the track jump. After only the sled move is carried out, however, the laser spot SP is not always put in a state of on-track along a wobbled groove WG. For this reason, a modulation component of wobbling is actually detected by the driver controller 46 on a trial basis after execution of one sled move or a track jump at the step S107. If no such component is detected, a jump of 1 track is made and processing to establish a state of on-track along the wobbled groove WG is carried out. That is to say, pieces of processing similar to those carried out at the steps S304 and S305 of the flowchart shown in FIG. 18 are performed. Then, the flow of the processing goes back to the step S105.

In this way, the search operation of the step S107 is carried out repeatedly to obtain a present address equal to the target address obtained at the step S105. At that time, an acknowledgment outcome of the judgment is obtained at the step S106 in which case the flow of the processing continues to a step S108.

With the processing up to the step S108, the laser spot SP is put in a state of on-track along a wobbled groove WG having the target address.

Then, at the step S108B, the land track serving as a target of the access of the request received earlier is examined by the driver controller 46 to form a judgment as to whether the target land track is a track Tr•A or Tr•B. If the target land track is a track Tr•A, the flow of the processing goes on to a step S109. If the target land track is a track Tr•B, on the other hand, the flow of the processing goes on to a step S110.

At the step S109, processing is carried out by the driver controller 46 to gradually increment the bias value of 0 set in the tracking bias register 305 shown in FIG. 15 in the plus direction.

The laser spot SP originated from the objective lens 220 thus starts to move from the wobbled groove WG serving as a present track to a land track serving as a track Tr•A at a position adjacent to the inner-side circumference of the present track. That is to say, control of a jump of 0.5 tracks in the direction toward the inner side is started.

At the step S110, on the other hand, processing is carried out by the driver controller 46 to gradually increment the bias value of 0 set in the tracking bias register 305 in the minus direction.

The laser spot SP originated from the objective lens 220 thus starts to move from the present track Tr•A to a land track serving as a wobbled groove WG at a position adjacent to the outer-side circumference of the present track. That is to say, control of a jump of 0.5 tracks in the direction toward the outer side is started.

After the processing of the step S109 or S110 is carried out, the flow of the processing goes on to a step S111.

At the step S111, the driver controller 46 compares the level of the pull-in signal PI with the threshold value th shown in FIG. 14C and 14F. In this case, the level of the pull-in signal PI has changed to accompany the movement of the laser spot SP in a direction toward an inner or outer circumference respectively as a result of the processing carried out at the step S109 or S110 respectively. The comparison at the step S111 is carried out repeatedly till the level of the pull-in signal PI exceeds the threshold value th. That is to say, also in this case, the comparison is carried out by the driver controller 46 in place of the operation of the comparator 303 shown in FIG. 15 much like the step S206 of the flowchart shown in FIG. 17. As the outcome of the comparison by the driver controller 46 indicates that the level of the pull-in signal PI exceeds the threshold value th, the flow of the processing goes on to a step S112.

In the processing described above, the operating polarity of the tracking-servo control circuit is an opposite polarity to produce a converging operation to trace a groove as a result of the search.

At the step S112, the terminal connection of the switch 307 shown in FIG. 15 is changed over by the driver controller 46 from a connection of the terminals T2 and T3 to a connection of the terminals T1 and T3 to carry out processing to invert the operating polarity of the tracking-servo control circuit to the positive polarity.

At the end of the processing carried out at the step S112, the operation controlled by the driver controller 46 to make an access to a target track implemented as a land track Tr•A or Tr•B having an address specified by the request for the access is finished.

7. Modified Versions

The descriptions given: so far assume that the disc adopts the interlace addressing system which is prescribed with the recording track implemented by a land. That is to say, the land recording system is adopted as a a groove/land recording technique.

It should be noted, however, that the system to record data onto a groove is also widely adopted as a disc recording technique. In addition, the interlace addressing system adopted in this embodiment can also be applied to a disc embracing the groove recording technique.

Figure 19:
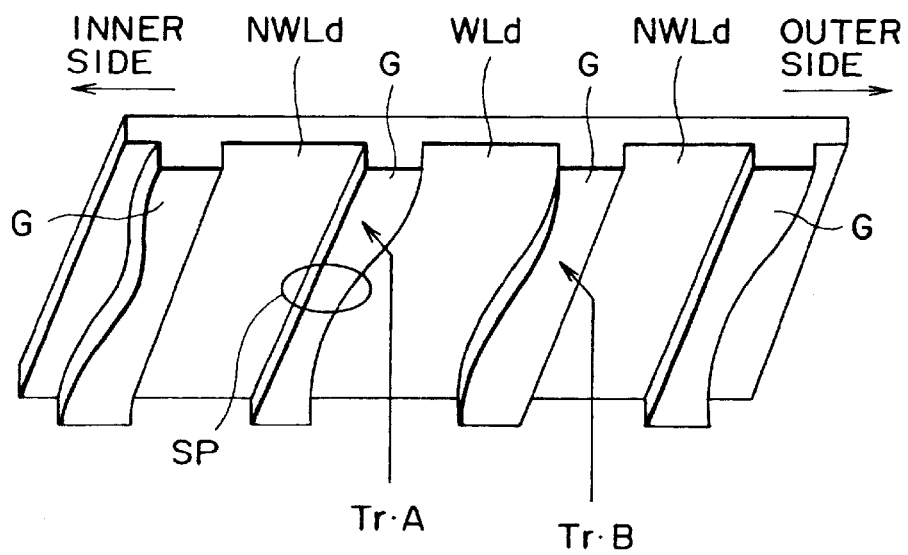
FIG. 19 is a diagram showing a squint view of a typical configuration of a n inter lace addressing disc designed as a typical modification compatible with the embodiment.

FIG. 19 is a diagram showing a typical structure of a disc adopting the interlace addressing system based on the groove recording technique.

The figure shows an enlarged portion of a signal surface extracted from a disc adopting the interlace addressing system based on the groove addressing technique.

As shown in the figure, a groove G is used as a recording track. To put it in detail, the recording tracks are tracks Tr•A and Tr•B which are formed as a pair of 2 tracks having a spiral-like shape. Between any 2 adjacent grooves G serving as tracks Tr•A and Tr•B respectively, a wobbled land WLd with wobbling obtained as a result of frequency modulation based on address information or a non-wobbled land NWLd with no wobbling at all is created alternately in the radial direction of the disc.

As a result, a groove is used as either a track Tr•A or a track Tr•B of 2 tracks forming a pair. In this track structure, only the outer-circumference side of the track Tr•A and only the inner-circumference side of the track Tr•B are wobbled. The wobbling on the sides of the 2 tracks Tr•A and Tr•B forming a pair is address information for a wobbled land WLd sandwiched by the 2 tracks Tr•A and Tr•B.

The access operations conforming to the track configuration explained earlier are applicable to a disc adopting the interlace addressing system based on the groove recording technique for the above track structure. In this case, since a recording track is a groove, the opposite polarity of the tracking-servo control circuit explained earlier is the operating polarity of normal recording and playback operations. On the contrary, the positive polarity of the tracking-servo control circuit explained earlier is the operating polarity of a search operation to establish a state of on-track along a land not used as a recording track.

It should be noted that the scope of the present invention is not limited to the configurations described above. That is to say, a variety of changes can be made. In the case of the embodiment described above, for example, the disc drive apparatus is exemplified by a video recorder/player mounted on a video camera apparatus. It is worth noting that the disc drive apparatus can also be combined with another apparatus. As an alternative, the disc drive apparatus can also be a stand-alone apparatus. In addition, the present invention can also be applied to a disc drive apparatus dedicated to operations to record and play back audio data.

Furthermore, a disc adopting the interlace addressing system is exemplified by a magneto optical disc in the embodiment described above. It should be noted that the present invention can also be applied to a disc adopting a phase change system used in a rewritable DVD (Digital Video Disc/Digital Versatile Disc) and an addition-type disc with a color film such a CD-R used as a recording signal surface.

Moreover, the disc adopting the interlace addressing system is exemplified by a disc with the track thereof having a spiral-like form. It is worth noting that the present embodiment, can also be applied to a disc having circular tracks. That is to say, the present invention can be applied to a disc having a format prescribing that a groove and a land adjacent to each other are used as 2 recording tracks forming a pair. An example of such a disc is a disc with a track structure wherein circular grooves and lands are laid out in the radial direction of the disc as described so far.

As described above, the present invention is applicable to an interlace addressing disc having a structure wherein wobbled grooves (wobbled tracks) and non-wobbled grooves (non-wobbled tracks) are laid out alternately to create circular tracks (grooves or lands) of the first type. 2 adjacent tracks of the first type sandwich a circular track (land or groove) with wobbling provided on a surface on one side only. The operating polarity of a tracking-servo control circuit for a circular track of the first type is an inverted operating polarity of the tracking-servo control circuit for a circular track of the second type and vice versa.

In an operation to record or play back data into and from such an interlace addressing disc, a bias is provided to a tracking-error signal to forcibly move an objective lens (or the radiation position of a laser spot) in the radial direction of the disc. At that time, the operating polarity of the tracking-servo control circuit is changed on the basis of a difference in reflected-light intensity between a groove and a land. To put it in detail, the operating polarity of the tracking-servo control circuit is inverted when the intensity of the reflected beam exceeds a predetermined value used as a criterion.

Thus, according to the present invention, a jump of 0.5 tracks can be made correctly from a groove to a land adjacent to the groove or from a land to a groove adjacent to the land. By making such a jump of 0.5 tracks, it is possible to increase the efficiency of control of operations to record and play back data into and from an interlace addressing disc independence on the use of the jump of 0.5 tracks.

In the first place, in the interlace addressing system, the second circular track, one side of which is wobbled so that addresses are shared by 2 tracks forming a pair, is used as a recording track. If no data is recorded on this recording track, however, in the configuration of an optical system of a pickup adopting a 1-beam system based on a push-pull technique and the configuration of a signal processing circuit thereof, it is impossible to identify which one of the 2 tracks composing the pair is being traced.

In order to solve this problem, in an access to a land used as a recording track, for example, a search operation is carried out to eventually put the laser spot SP or the objective lens in a state of on-track along a groove including an address being accessed.

In a state of on-track along a groove, it is possible to univocally identify which one of the 2 land tracks forming a pair on both sides of the groove in the structure of the interlace addressing disc is being traced by the laser spot SP without regard to whether the state of on-track is established along a wobbled groove or a non-wobbled groove.

Thus, after the laser spot SP has been put in a state of on-track along a groove including an address being accessed, the direction of the movement of an objective lens toward the land track serving as the eventual target of the access is determined, and a jump of 0.5 tracks is made so that a correct access can be completed by identifying the target track even if no data is recorded in the land track.

In addition, the present invention forms a judgment as to whether of not a modulation component of wobbling is obtained with the laser spot SP put in a state of on-track along a circular track of the first type. The formation of the judgment is based on information conveyed by a beam reflected by a photo detector at that time.

An undetected modulation component of wobbling indicates that the circular track of the first type along which the state of on-track is established is a non-wobbled track. In this case, the configuration of the present invention lets a jump of 1 track be made to a circular track of the first type adjacent to this non-wobbled track, that is, a jump of 1 track to a wobbled track be made.

According to the present invention described above, when the laser spot SP arrives at a non-wobbled track in the course of execution of a search operation to make an access, an address can be obtained by letting the laser spot jump to a wobbled track adjacent to the non-wobbled track. That is to say, in an access, each time a search operation is completed, an address is acquired with a high degree of accuracy for computation of a movement distance so that a next search operation can be carried out. Also in this way, a correct search operation can be carried out.

Even if the configuration of the optical system of the pickup adopting the 1-beam system based on the push-pull technique and the configuration of the signal processing circuit are adopted as configurations of the present invention as described above, it is possible to correctly execute control accompanying recording and playback operations such as an access to a disc adopting the interlace addressing system.

In other words, the disc drive apparatus for driving a disc adopting the interlace addressing system can be designed to adopt the configuration of the optical system of the pickup adopting the 1-beam system based on the push-pull technique and the configuration of the signal processing circuit, promoting simplification of the circuit configuration and reduction of the cost.

What is claimed is:

1. An optical-disc recording and/or playback apparatus capable of carrying out operations to record and play back data into and from an optical disc, said disc having first tracks including a wobbled track and a non-wobbled track each implemented by either a land or a groove where a wobbled track is a track with both side surfaces thereof wobbled and a non-wobbled track is a track with neither of side surfaces thereof wobbled, and having second tracks each sandwiched by said first tracks and used for recording information wherein if said first track is implemented by a groove, said second track is implemented by a land and if said first track is implemented by a land, said second track is implemented by a groove, said optical-disc recording and/or playback apparatus comprising:

radiation means for radiating a beam to any particular one of said tracks on said optical disc;

reflected-beam detection means for detecting a beam reflected by said particular track on said optical disc;

control means for controlling said radiation means so as to have said radiation means trace a wobbled track adjacent to said particular track in accordance with said reflected beam;

tracking-error-signal generation means for generating a tracking-error signal in accordance with a reflected beam; and tracking-servo means for executing control so as to have said radiation means trace one of said tracks on said optical disc on the basis of said tracking-error signal generated by said tracking-error-signal generation means, wherein when said track traced by said radiation means is located in an unrecorded area, said control means inverts an operating polarity of said tracking servo means, executes move control so as to have said radiation means trace one of said first tracks, and forms a judgment as to whether said first track traced by said radiation means is a wobbled track or a non-wobbled track.

2. An optical-disc recording and/or playback apparatus according to claim 1, further comprising demodulation means for demodulating information recorded on any particular one of said second tracks receiving a beam radiated by said radiation means from a reflected beam, wherein said control means uses information recorded on said particular second track and modulated by said modulation means to form a judgment as to whether or not said particular second track is located on an inner-circumference or outer-circumference side of said traced wobbled track.

3. An optical-disc recording and/or playback apparatus according to claim 1, wherein if said first track traced by said radiation means is a non-wobbled track, said control means executes move control so as to have said radiation means trace one of said wobbled tracks adjacent to said non-wobbled track.

4. An optical-disc recording and/or playback apparatus according to claim 1, further comprising demodulation means for demodulating an address of any particular one of said wobbled tracks traced by said radiation means from said particular wobbled track.

5. An optical-disc recording and/or playback apparatus according to claim 4, wherein said control means compares an address modulated by said modulation means with a target address desired by a user and executes control of a movement in a radial direction of said optical disc in accordance with a result of comparison so as to control said radiation means so that said modulated address matches said target address.

6. An optical-disc recording and/or playback apparatus according to claim 5, further comprising bias means for applying a bias to a target value of said tracking-servo means in accordance with whether an address on any particular one of said second tracks desired by the user is on an outer-circumference or inner-circumference side of said wobbled track, wherein said tracking-servo means executes control of a movement of said radiation means in a radial direction of said optical disc so as to have said radiation means trace one of said second tracks adjacent to said wobbled track in accordance with said target value to which a bias is applied by said bias means.

7. An optical-disc recording and/or playback apparatus according to claim 6, wherein said control means compares a quantity of a reflected beam detected by said reflected-beam detection means with a predetermined value, and executes move control by inverting an operating polarity of said tracking-servo means so that said quantity of said reflected beam attains said predetermined value and said radiation means traces said second track.

8. An optical-disc recording and/or playback apparatus according to claim 1, further comprising recording means for recording information applying a magnetic field modulated by said information to a recording surface of said optical disc.

9. An optical-disc recording and/or playback apparatus according to claim 8, wherein said recording means applies a magnetic field modulated by information to be recorded to said recording surface of said optical disc and radiates said beam as pulses to said recording surface of said optical disc synchronously with said information.

10. An optical-disc recording and/or playback apparatus according to claim 1, wherein said radiation means and said reflected-beam detection means each include a laser coupler.

11. An optical-disc recording and/or playback apparatus according to claim 1, wherein said tracking-error-signal generation means generates said tracking-error signal based on a push-pull signal extracted from a difference in detected light intensity between detection areas of said reflected-beam detection means which are obtained as a result of dividing said reflected-beam detection means by a line in a track direction.

12. An optical-disc recording and/or playback apparatus according to claim 11, further comprising lens-shift-signal generation means for generating a lens-shift signal serving as an offset for canceling a component representing a shift of said reflected-beam detection means in a radial direction of said optical disc from said push-pull signal.

13. An optical-disc recording and/or playback apparatus according to claim 12, wherein said lens-shift-signal generation means generates said lens-shift signal based on wobbling modulated components detected from said detection areas of said reflected-beam detection means which are obtained as a result of dividing said reflected-beam detection means by a line in a track direction.

14. An optical-disc recording and/or playback apparatus according to claim 12, wherein said lens-shift-signal generation means generates said lens-shift signal by multiplying a sum of a maximum value and a minimum value of said push-pull signal.

15. An optical-disc recording and/or playback apparatus according to claim 8, further comprising photographing means for carrying out an opto electrical conversion process to convert, an optical picture of an object of photographing into picture data to be recorded into said optical disc.

16. An optical-disc recording and/or playback apparatus according to claim 1, further comprising playback means for playing back information recorded on said optical disc in accordance with said reflected beam.

17. An optical-disc recording and/or playback apparatus according to claim 16, wherein information recorded on said optical disc, is video and/or image information.

18. An optical-disc recording and/or playback apparatus according to claim 16, wherein information recorded on said optical disc is audio information.

19. An optical-disc recording and/or playback method for carrying out operations to record and play back data into and from an optical disc, said disc having first tracks including a wobbled track and a non-wobbled track each implemented by either a land or a groove where a wobbled track is a track with both side surfaces thereof wobbled and a non-wobbled track is a track with neither of side surfaces thereof wobbled and having second tracks each sandwiched by said first tracks and used for recording information wherein if said first track is implemented by a groove, said second track is implemented by a land and if said first track is implemented by a land, said second track is implemented by a groove, said optical-disc recording and/or playback method comprising:

radiating a beam to any particular one of said tracks on said optical disc;

detecting a beam reflected by said particular track on said optical disc;

controlling said radiation step so as to have said beam radiated at said radiation step trace a wobbled track adjacent to said particular track in accordance with said reflected beam;

generating a tracking-error signal in accordance with a reflected beam; and executing tracking-servo control so as to have said radiation step trace one of said tracks on said optical disc on the basis of said tracking-error signal generated in said tracking-error-signal generation step, wherein when said track traced in said radiation step is located in an unrecorded area, said control step inverts an operating polarity of said executing tracking-servo control step, executes move control so as to have said radiation step trace one of said first tracks, and forms a judgment as to whether said first track traced by said radiation step is a wobbled track or a non-wobbled track.

20. A tracking control method for carrying out operations to record and play back data into and from an optical disc, said disc having first tracks comprising a wobbled track and a non-wobbled track each implemented by either a land or a groove where a wobbled track is a track with both side surfaces thereof wobbled and a non-wobbled track is a track with neither of side surfaces thereof wobbled, and having second tracks each sandwiched by said first tracks and used for recording information wherein if said first track is implemented by a groove, said second track is implemented by a land and if said first track is implemented by a land, said second track is implemented by a groove, said tracking control method comprising:

radiating a beam to any particular one of said tracks on said optical disc;

detecting a beam reflected by said particular track on said optical disc; and controlling said radiation step so as to have said beam radiated at said radiation step trace a wobbled track adjacent to said particular track in accordance with said reflected beam;

generating a tracking-error signal in accordance with a reflected beam; and executing tracking-servo control so as to have said radiation step trace one of said tracks on said optical disc on the basis of said tracking-error signal generated in said tracking-error-signal generation step, wherein when said track traced in said radiation step is located in an unrecorded area, said control step inverts an operating polarity of said executing tracking-servo control step, executes move control so as to have said radiation step trace one of said first tracks, and forms a judgment as to whether said first track traced by said radiation step is a wobbled track or a non-wobbled track.

21. A tracking control method according to claim 20, further comprising demodulating an address of any particular one of said wobbled tracks traced at said radiation step from said particular wobbled track.

22. A tracking control method according to claim 21, wherein, at said control step, an address modulated at said modulation step is compared with a target address desired by the user and control of a movement in a radial direction of said optical disc is executed in accordance with a result of comparison, that is, said radiation step is controlled so that said modulated address matches said target address.

23. A tracking control method according to claim 22, further comprising applying a bias to a target value used at said tracking-servo step in accordance with whether an address on any particular one of said second tracks desired by the user is on an outer-circumference or inner-circumference side of said wobbled track, wherein at said tracking-servo step, control of a movement in a radial direction of said optical disc carried out at said radiation step is executed so as to have said beam radiated at said radiation step trace one of said second tracks adjacent to said wobbled track in accordance with said target value to which a bias is applied at said bias step.

24. An optical-disc recording and/or playback apparatus capable of carrying out operations to record and play back data into and from an optical disc, said disc having first tracks including a wobbled track and a non-wobbled track each implemented by either a land or a groove where a wobbled track is a track with both side surfaces thereof wobbled and a non-wobbled track is a track with neither of side surfaces thereof wobbled, and having second tracks each sandwiched by said first tracks and used for recording information wherein if said first track is implemented by a groove, said second track is implemented by a land and if said first track is implemented by a land, said second track is implemented by a groove, said optical-disc recording and/or playback apparatus comprising:

a radiation unit configured to radiate a beam to any particular one of said tracks on said optical disc;

a reflected-beam detection unit configured to detect a beam reflected by said particular track on said optical disc;

a control unit configured to control said radiation unit so as to have said radiation unit trace a wobbled track adjacent to said particular track in accordance with said reflected beam;

a tracking-error-signal generation unit configured to generate a tracking-error signal in accordance with a reflected beam; and a tracking-servo unit configured to execute control so as to have said radiation unit trace one of said tracks on said optical disc on the basis of said tracking-error signal generated by said tracking-error-signal generation unit, wherein when said track traced by said radiation unit is located in an unrecorded area, said control unit inverts an operating polarity of said tracking servo unit, executes move control so as to have said radiation unit trace one of said first tracks, and forms a judgment as to whether said first track traced by said radiation unit is a wobbled track or a non-wobbled track.

25. An optical-disc recording and/or playback apparatus according to claim 24, further comprising a demodulation unit configured to demodulate information recorded on any particular one of said second tracks receiving a beam radiated by said radiation unit from a reflected beam, wherein said control unit uses information recorded on said particular second track and modulated by said modulation unit to form a judgment as to whether or not said particular second track is located on an inner-circumference or outer-circumference side of said traced wobbled track.

26. An optical-disc recording and/or playback apparatus according to claim 24, wherein if said first track traced by said radiation unit is a non-wobbled track, said control unit executes move control so as to have said radiation unit trace one of said wobbled tracks adjacent to said non-wobbled track.

27. An optical-disc recording and/or playback apparatus according to claim 24, further comprising a demodulation unit configured to demodulate an address of any particular one of said wobbled tracks traced by said radiation unit from said particular wobbled track.

28. An optical-disc recording and/or playback apparatus according to claim 27, wherein said control unit compares an address modulated by said modulation unit with a target address desired by a user and executes control of a movement in a radial direction of said optical disc in accordance with a result of comparison so as to control said radiation unit so that said modulated address matches said target address.

29. An optical-disc recording and/or playback apparatus according to claim 28, further comprising a bias unit configured to apply a bias to a target value of said tracking-servo unit in accordance with whether an address on any particular one of said second tracks desired by the user is on an outer-circumference or inner-circumference side of said wobbled track, wherein said tracking-servo unit executes control of a movement of said radiation unit in a radial direction of said optical disc so as to have said radiation unit trace one of said second tracks adjacent to said wobbled track in accordance with said target value to which a bias is applied by said bias unit.

30. An optical-disc recording and/or playback apparatus according to claim 29, wherein said control unit compares a quantity of a reflected beam detected by said reflected-beam detection unit with a predetermined value, and executes move control by inverting an operating polarity of said tracking-servo unit so that said quantity of said reflected beam attains said predetermined value and said radiation unit traces said second track.

31. An optical-disc recording and/or playback apparatus according to claim 24, further comprising a recording unit configured to record information applying a magnetic field modulated by said information to a recording surface of said optical disc.

32. An optical-disc recording and/or playback apparatus according to claim 31, wherein said recording unit applies a magnetic field modulated by information to be recorded to said recording surface of said optical disc and radiates said beam as pulses to said recording surface of said optical disc synchronously with said information.

33. An optical-disc recording and/or playback apparatus according to claim 24, wherein said radiation unit and said reflected-beam detection unit each include a laser coupler.

34. An optical-disc recording and/or playback apparatus according to claim 24, wherein said tracking-error-signal generation unit generates said tracking-error signal based on a push-pull signal extracted from a difference in detected light intensity between detection areas of said reflected-beam detection unit which are obtained as a result of dividing said reflected-beam detection unit by a line in a track direction.

35. An optical-disc recording and/or playback apparatus according to claim 34, further comprising a lens-shift-signal generation unit configured to generate a lens-shift signal serving as an offset for canceling a component representing a shift of said reflected-beam detection unit in a radial direction of said optical disc from said push-pull signal.

36. An optical-disc recording and/or playback apparatus according to claim 35, wherein said lens-shift-signal generation unit generates said lens-shift signal based on wobbling modulated components detected from said detection areas of said reflected-beam detection unit which are obtained as a result of dividing said reflected-beam detection unit by a line in a track direction.

37. An optical-disc recording and/or playback apparatus according to claim 35, wherein said lens-shift-signal generation unit generates said lens-shift signal by multiplying a sum of a maximum value and a minimum value of said push-pull signal.

38. An optical-disc recording and/or playback apparatus according to claim 31, further comprising a photographing unit configured to perform an opto electrical conversion process to convert an optical picture of an object of photographing into picture data to be recorded into said optical disc.

39. An optical-disc recording and/or playback apparatus according to claim 24, further comprising a playback unit configured to play back information recorded on said optical disc in accordance with said reflected beam.

40. An optical-disc recording and/or playback apparatus according to claim 39, wherein information recorded on said optical disc is video and/or image information.

41. An optical-disc recording and/or playback apparatus according to claim 39, wherein information recorded on said optical disc is audio information.

* * * * *

UNITED STATES PATENT AND TRADEMARK OFFICE
CERTIFICATE OF CORRECTION

PATENT NO. : 6,577,566 B1
DATED : June 10, 2003
INVENTOR(S) : Nobuyoshi Tomita

It is certified that error appears in the above-identified patent and that said Letters Patent is hereby corrected as shown below:

Title page,
Item [57], ABSTRACT,
Line 1, please change "Disclosed to an apparatus" to -- An apparatus --;
Line 2, please change "having:" to -- having --;
Line 4, please change "groove;" to -- groove, --;
Lines 14-17, please change "reflected beam. The apparatus is capable of generating a tracking-error signal by using only 1 beam" to -- reflected beam. --

Column 1,
Line 51, please change "f or" to -- for --.

Column 4,
Line 42, please change "flow chart" to -- flowchart --.

Column 9,
Line 30, please change "from,the" to -- from the --.

Column 10,
Line 22, please change "312" to -- 32 --.

Column 14,
Line 28, please change "PLL," to -- PLL --.

Column 15,
Line 43, please change "lll," to -- lll --.
Lind 54, please change "controller" to controller 46. --

Column 17,
Line 42, please change "it" to -- It --.

Column 18,
Line 6, please change "on" to -- On --.
Line 16, please change "detector s" to -- detectors --.
Line 26, please change "in" to -- In --.

Column 19,
Line 42, please change "the arithmetic" to -- the following arithmetic --.
Line 45, please change "(Ix + Jx)" to -- (Ix + Jx). --

UNITED STATES PATENT AND TRADEMARK OFFICE
CERTIFICATE OF CORRECTION

PATENT NO. : 6,577,566 B1
DATED : June 10, 2003
INVENTOR(S) : Nobuyoshi Tomita

It is certified that error appears in the above-identified patent and that said Letters Patent is hereby corrected as shown below:

<u>Column 20,</u>
Line 51, please change "Shift" to -- shift --.

<u>Column 21,</u>
Line 19, please change "tracking error" to -- tracking-error --;
Lines 41-42, please change "super posed" to -- superposed --.

<u>Column 28,</u>
Line 24, please change "when" to -- When --;
Line 45, please change "reach" to -- each --;
Line 55, please change "and" to -- land --.

<u>Column 29,</u>
Line 19, please change "this set" to -- th is set --.
Lines 54-55, please change "other hand" to -- tracking-servo --.

<u>Column 30,</u>
Line 45, please change "with." to -- with --

<u>Column 31,</u>
Line 13, please change "of" to -- or --;
Line 18, please change "show n" to -- shown --.

<u>Column 35,</u>
Line 47, please change "S108B" to -- S108 --.

<u>Column 36,</u>
Line 41, please change "given:" to -- given --.

<u>Column 38,</u>
Line 7, please change "independence" to -- in dependence --

UNITED STATES PATENT AND TRADEMARK OFFICE
CERTIFICATE OF CORRECTION

PATENT NO. : 6,577,566 B1
DATED : June 10, 2003
INVENTOR(S) : Nobuyoshi Tomita

It is certified that error appears in the above-identified patent and that said Letters Patent is hereby corrected as shown below:

Column 38 (cont'd),
Line 36, please change "whether of" to -- whether or --.

Signed and Sealed this

Eighth Day of June, 2004

JON W. DUDAS
*Acting Director of the United States Patent and Trademark Office*